US012624794B2

(12) United States Patent
Bjørn et al.

(10) Patent No.: US 12,624,794 B2
(45) Date of Patent: May 12, 2026

(54) SUBSEA STORAGE OF A WATER MISCIBLE STORAGE FLUID

(71) Applicant: Grant Prideco, Inc., Wilmington, DE (US)

(72) Inventors: Marius Bjørn, Drammen (NO); Kristian Mikalsen, Oslo (NO); Tom Grimseth, Oslo (NO); Geir Vingelven, Hovik (NO)

(73) Assignee: GRANT PRIDECO, INC., Wilmington, DE (US)

( * ) Notice: Subject to any disclaimer, the term of this patent is extended or adjusted under 35 U.S.C. 154(b) by 263 days.

(21) Appl. No.: 18/276,715

(22) PCT Filed: Feb. 17, 2022

(86) PCT No.: PCT/EP2022/053882
§ 371 (c)(1),
(2) Date: Aug. 10, 2023

(87) PCT Pub. No.: WO2022/179921
PCT Pub. Date: Sep. 1, 2022

(65) Prior Publication Data

US 2024/0318780 A1 Sep. 26, 2024

(30) Foreign Application Priority Data

Feb. 26, 2021 (EP) .................................... 21159600
Apr. 23, 2021 (EP) .................................... 21170177

(51) Int. Cl.
*F17C 1/00* (2006.01)

(52) U.S. Cl.
CPC ........ *F17C 1/007* (2013.01); *F17C 2201/052* (2013.01); *F17C 2203/0682* (2013.01);
(Continued)

(58) Field of Classification Search
CPC ........ F17C 2203/0682; F17C 2250/034; F17C 2250/0426; F17C 2250/043; F17C 1/007; B65D 88/78; B65D 90/48
See application file for complete search history.

(56) References Cited

U.S. PATENT DOCUMENTS 4,230,138 A * 10/1980 Tanaka .................. B65D 88/78 137/340
4,351,623 A * 9/1982 Heinz .................... E21B 43/36 210/522

(Continued)

FOREIGN PATENT DOCUMENTS

DE 199 23 901 11/2000
GB 2566551 3/2019

(Continued)

OTHER PUBLICATIONS

International Search Report and Written Opinion of the International Searching Authority issued Jun. 1, 2022 in International (PCT) Application No. PCT/EP2022/053882.

(Continued)

*Primary Examiner* — Benjamin F Fiorello
(74) *Attorney, Agent, or Firm* — Wenderoth, Lind & Ponack, L.L.P.

(57) ABSTRACT

The present invention relates to a subsea storage system for storing a water miscible storage fluid and methods related thereto.

26 Claims, 9 Drawing Sheets

(52) U.S. Cl.
CPC ................. *F17C 2205/0326* (2013.01); *F17C 2250/034* (2013.01); *F17C 2250/0426* (2013.01); *F17C 2270/0128* (2013.01)

(56) References Cited

U.S. PATENT DOCUMENTS

| | | | | |
|---|---|---|---|---|
| 5,224,962 | A | 7/1993 | Karal et al. | |
| 7,654,279 | B2 * | 2/2010 | Horton, III | B65D 88/78 137/236.1 |
| 9,540,169 | B1 | 1/2017 | Krohn | |
| 9,664,019 | B2 | 5/2017 | Brodt | |
| 9,791,105 | B2 * | 10/2017 | Whiteman | F17C 5/06 |
| 10,995,906 | B1 * | 5/2021 | Meheen | B65G 5/00 |
| 2003/0071736 | A1 * | 4/2003 | Brazier | F17C 13/02 340/614 |
| 2008/0041068 | A1 | 2/2008 | Horton et al. | |
| 2008/0041291 | A1 | 2/2008 | Horton et al. | |
| 2012/0260839 | A1 | 10/2012 | Maher et al. | |
| 2013/0002443 | A1 * | 1/2013 | Breed | B65D 90/48 340/686.1 |
| 2014/0133922 | A1 * | 5/2014 | Hantz | B65D 88/78 405/210 |
| 2014/0301790 | A1 * | 10/2014 | Chitwood | B63G 8/001 114/256 |
| 2014/0341657 | A1 * | 11/2014 | Chitwood | E04H 7/02 405/209 |
| 2015/0040985 | A1 * | 2/2015 | Roberge | F17C 13/04 137/861 |
| 2015/0246770 | A1 * | 9/2015 | Chang | F17C 1/007 405/207 |
| 2015/0354335 | A1 | 12/2015 | Alqahtani | |
| 2016/0023843 | A1 * | 1/2016 | Donahue | B65D 88/78 114/257 |
| 2016/0325927 | A1 * | 11/2016 | Chitwood | B65D 90/046 |
| 2017/0233181 | A1 | 8/2017 | Elazari-Volcani | |
| 2017/0259993 | A1 | 9/2017 | Chitwood et al. | |
| 2022/0178732 | A1 * | 6/2022 | Burcham | G01S 15/88 |

FOREIGN PATENT DOCUMENTS

| | | | | |
|---|---|---|---|---|
| WO | 2009/133563 | A2 | 11/2009 | |
| WO | 2009/133563 | A3 | 11/2009 | |
| WO | 2020/128890 | | 6/2020 | |
| WO | WO-2020161211 | A1 * | 8/2020 | F17C 13/082 |

OTHER PUBLICATIONS

Extended European Search Report issued Oct. 13, 2021 in European Application No. 21170177.6.

Hjertaker, BT et al., "Level Measurement and Control Strategies for Subsea Separators", Journal of Electronic Imaging, SPIE—International Society for Optical Engineering, US, vol. 10, No. 3, Jul. 2001, pp. 679-589, XP001086906.

* cited by examiner

SUBSEA STORAGE OF A WATER MISCIBLE STORAGE FLUID

TECHNICAL FIELD

The present invention relates to a subsea storage system for storing a water miscible storage fluid and methods related thereto.

BACKGROUND AND PRIOR ART

There is extensive concurrence on the future of ammonia as a prime hydrogen carrier for ship propulsion, platform power and even small island power supply. The current infrastructure capacity is about 180 mil tons ammonia per year. It is expected that demand and supply will outgrow this capacity, and that extensive infrastructure with regards to fabrication facilities, transportation systems and power generation systems will be added to the current infrastructure.

Along with growth in the above-mentioned infrastructure, the demand for storage of ammonia is expected to grow. Thus, it is expected that there will be a need for practical and safe storage systems for large quantities of ammonia in many locations around the world. Easy maintenance of such storage system is also desirable.

Ammonia is a gas at room temperature and 1 bara pressure. Storing a substance in the gas phase is sub optimal due to the large volume tanks required. Gases are thus typically stored in liquid form. Ammonia is in the liquid form at minus 37 degrees C. and 1 bara, or at a pressure of about 8.5 bara and room temperature, or at several compromises between these values according to the physical state of liquid ammonia at a given temperature and pressure. Subsea storage offers the benefit of an environment where ammonia may be kept in liquid form by the natural pressure and temperature of the ambient sea without requiring artificial pressure or additional cooling.

Subsea storage of liquified gases such as ammonia is known from WO2009/133663, which discloses that a gas such as ammonia can be stored in an impermeable flexible undersea storage vessel that utilizes the undersea conditions for maintaining the gas in a liquid form. The storage vessel could be made of polymeric fabrics such as Kevlar.

U.S. Pat. No. 9,540,169 discloses a subsea storage tank for storage of bulk fluids which comprises an upper shell and a lower shell bolted together. The interior comprises a bladder that acts as a barrier between the bulk fluid in one half of the tank and seawater that is allowed to enter free on the opposite side of the barrier to compensate for the varying pressure resulting from varying amounts of bulk fluid in the tank. This tank adds the security of a shell and a test system that signals need for maintenance but requires subsea maintenance or that the entire tank is serviced at the surface.

US2008041068 describes a gas storage facility on the bottom of the ocean in deep water. The gas storage facility comprises a pressure equalized tank-system wherein the tank comprises an inflexible thin walled vessel for storing compressed gas under water. The storage vessel has a gas intake port near the top region and is pressure equalized by the surrounding water in that a water intake port is located at the bottom region of the gas storage facility. It is stated that the gases for storage may be natural gases such as liquid natural gas (LNG) or compressed natural gas (CNG). Depending on the gas that is to be stored it may be necessary to provide a barrier between the gas and water for example for avoiding diffusion of gas into the water and/or formation of hydrates. Examples of barriers may be floating membranes, inflatable/compressible bags for gas containment of gas or a layer of fluid which provides an immiscible boundary, such as an oil-water emulsion layer at the layer interface. The gas storage facility comprises a control system for monitoring the gas level but does not provide information about the level of all phases or on the state of the barrier. The formation of an oil-water emulsion would not be compatible with storage of water miscible liquids because an oil-water emulsified barrier would not be effective.

It is thus an object of the present invention to provide a subsea storage system for water miscible fluids that at least mitigates the above-mentioned drawbacks of the prior art.

More particular it is an object of the present invention to provide a subsea storage system for water miscible fluids that offers possibility of in situ control and/or maintenance of the subsea storage unit without the need for costly subsea disassembly or retrieving the subsea storage system to the surface.

Also, it is an object of the present invention to provide a method for maintenance of a subsea storage system according to the present invention.

SUMMARY OF THE INVENTION

The present invention is set forth and characterized in the main claims, while the dependent claims describe other characteristics of the invention.

In a first aspect the invention concerns a subsea storage system comprising a subsea storage unit for storing a water miscible storage fluid. The subsea storage unit comprises a wall defining an inner storage volume for storing fluids, wherein the inner storage volume comprises a top side facing the sea surface, a vertical side and a bottom side facing the seafloor. The inner storage volume comprises a barrier fluid as a layer between the storage fluid and seawater for separating the storage fluid from the seawater. The barrier fluid is extending the entire horizontal cross section of the inner storage volume. The barrier fluid is also immiscible with both the storage fluid and seawater The inner storage volume has an upper section that extends down from the top side to the barrier fluid within the inner storage volume, and a lower section that extends up from the bottom side to the barrier fluid within the inner storage volume. The upper section comprises at least one upper section opening for fluid connection from the inner storage volume for loading and unloading the subsea storage unit with storage fluid. The lower section comprises at least one lower section opening for fluid connection from the inner storage volume to the ambient sea.

The stored storage fluid is comprised above the barrier fluid within the inner storage volume, and the seawater within the inner storage volume is comprised below the barrier fluid. The inner storage volume is pressure equalized by fluid connection to the ambient sea.

Further, the subsea storage system may comprise a monitoring system comprising

- a data processor for analyzing data, and
- at least one sensor located adjacent to or within the subsea storage unit for detecting characteristics of at least one of a fluid, fluid layer and fluid interphase within the subsea storage unit.

The at least one sensor may be located adjacent to the vertical side, top side or bottom side of the subsea storage unit, preferably adjacent to the vertical side.

Preferably, the barrier fluid has a thickness of at least 1%, or a thickness between 2-30%, 5-25%, 7-20%, 10-17% or 12-15% of the maximum vertical extent of the inner storage volume.

The sensor may be selected from any known sensors for measuring characteristics of fluids, fluid layers or fluid interphases. The sensor may be selected from at least one of a flow meter, a pH-sensor, capacity sensor, inductive sensor optical sensor, a nucleonic phase detector (having a cesium 137 source and a gamma ray receiver) and an acoustic fluid discrimination system (having an acoustic reflector and an acoustic transceiver).

In a preferred aspect of the subsea storage unit the storage fluid is liquid ammonia being in a liquid state at subsea conditions, such as depths of more than 75 meters at a temperature of less 10° C.

In this aspect the sensor of the monitoring system may be a pH-sensor detecting the pH of at least one of the fluids within the storage unit. As liquid ammonia is moderately alkaline detection of the pH and/or changes thereof in any one of the fluids within the storage unit, especially the liquid ammonia, will indicate if the storage fluid of liquid ammonia has been contaminated.

In one aspect the subsea storage unit may comprise an outer wall disposed adjacent to the wall for providing a two-walled subsea storage unit creating an annulus between the outer wall and the wall. The annulus may comprise an annulus fluid and the sensor of the monitoring system may comprise a detector for detecting characteristics of the annulus fluid.

The annulus fluid may be different from the storage fluid and is preferably seawater or barrier fluid. In the aspect that the storage fluid is liquid ammonia the sensor of the monitoring system may measure the pH of the annulus fluid thereby detecting any leakage of liquid ammonia into the annulus fluid.

In one aspect the subsea storage unit may comprise at least one or more fluid deflectors and/or fluid distributors located in the proximity of the upper section opening and/or the bottom section opening for preventing disruption of the barrier fluid by flow of fluid to or from the lower section opening or to or from the upper section opening.

In one aspect the subsea storage unit may comprise at least one fluid deflector located in the proximity of the upper section opening and/or the bottom section opening for preventing disruption of the barrier fluid by flow of fluid to or from the lower section opening or to or from the upper section opening.

In one aspect the subsea storage unit may comprise at least one fluid distributors located in the proximity of the upper section opening and/or the bottom section opening for preventing disruption of the barrier fluid by flow of fluid to or from the lower section opening or to or from the upper section opening.

In one aspect the subsea storage unit wall may comprise an anti-stick surface facing the inner storage volume. Preferably, the surface has a low wettability for at least one, preferably more than one, of the fluids within the inner storage volume.

The barrier fluid is, as stated before, immiscible with both seawater and storage fluid. The barrier fluid may be selected from at least one of biodiesel and a vegetable oil and may for example comprise canola oil and/or olive oil. However, such barrier fluid will, over time, dissolve in seawater creating an emulsion fluid of barrier fluid and seawater, also called emulsified barrier fluid. Hence, the amount of barrier fluid may slowly decrease as the emulsified fluid is created. The emulsified fluid occurs as an emulsified layer arranged between the barrier fluid and seawater. Such emulsified layer may be miscible with the storage fluid and thus contaminate the storage fluid. Having control of the amount of barrier fluid within the subsea storage unit may hence be important. Such control may be obtained by the monitoring system of the invention.

In one aspect the subsea storage unit may comprise at least one maintenance opening for fluid connection from the inner storage volume to the outside of the subsea storage unit, wherein the at least one maintenance opening is located at a distance that is 10-90%, 20-80%, 30-70%, 40-60% or 50% of the vertical extent of the inner storage volume below the top side. The at least one maintenance opening may be suitable for evacuating and/or adding fluid.

In another aspect the subsea storage unit may comprise at least one fluid conduit establishing a fluid connection from the inner storage volume to the outside of the subsea storage unit for adding and/or subtracting fluid into or from the subsea storage unit.

In one aspect the at least one fluid conduit may be fluidly connected to the upper section opening of the subsea storage unit and fluidly connectable to a tank at a surface installation, the conduit establishing fluid connection between the subsea storage unit and the tank.

In one aspect the at least fluid conduit may be fluidly connected to the lower section opening of the subsea storage unit and fluidly connectable to a tank at a surface installation, the conduit establishing fluid connection between the subsea storage unit and the tank.

In one aspect the at least fluid conduit may be fluidly connected to the upper section opening of the subsea storage unit and fluidly connectable to the seawater outside the subsea storage unit.

In another aspect the at least fluid conduit may be fluidly connected to the lower section opening of the subsea storage unit and fluidly connectable to seawater outside the subsea storage unit.

In one aspect the fluid conduct may be a maintenance fluid conduit which may enter the inner storage volume from the top side of the storage unit and extend, within the inner storage volume, to a maintenance fluid conduit end distal from the top side wall. Hence, the maintenance fluid conduit end distal from the top side wall may be a maintenance opening for evacuating and/or adding fluid.

For example, the maintenance opening or maintenance circuit may be suitable for evacuating emulsion fluid from the subsea storage unit or adding barrier fluid to the subsea storage unit.

Hence, in one aspect the maintenance fluid conduit may be a barrier fluid maintenance conduit wherein the end distal from the top side wall may be in fluid communication with the barrier fluid, i.e. the end distal from the top side wall being a barrier fluid maintenance opening e.g. for adding barrier fluid to the subsea storage unit. The other end of the conduit may hence be connectable to a tank of barrier fluid which can be arranged subsea or arranged at a surface installation such as a ship, platform or onshore.

In another aspect the maintenance fluid conduit may be a emulsion fluid maintenance conduit wherein the end distal from the top side wall may be in fluid communication with the emulsion fluid, i.e. the end distal from the top side wall being a emulsion fluid maintenance opening e.g. for extracting the emulsion fluid out of the subsea storage unit. The other end of the maintenance fluid conduit may be in fluid communication with the sea, releasing the emulsion fluid into the sea or it may be in fluid communication with a tank arranged subsea or at a surface installation for storing the emulsion fluid.

The person skilled in the art will understand that the subsea storage unit may comprise one or a plurality of fluid conduits.

The inventive subsea storage system may comprise a subsea storage unit according to any one of the above-mentioned aspects. Further, the subsea storage system comprises a monitoring system comprising a data processor for analyzing data and at least one sensor located adjacent to the vertical side or within the subsea storage unit.

The alt least one sensor may detect characteristics such as the volume, density, pH, chemical composition or elevation of at least one of the fluid(s), fluid layer(s) and fluid interphase(s) within the subsea storage unit.

Further, the system may comprise at least one transmitter for transmitting data from the sensor to the data processor. Hence, the monitoring system may monitor the characteristics of at least one of the fluid(s), fluid layer(s) and fluid interphase(s) within the subsea storage unit.

The monitoring system may be especially advantageous for monitoring characteristics of the barrier fluid and/or emulsion fluid.

In one aspect of the subsea storage system the monitoring system may comprise at least two sensors located adjacent to opposite vertical sides or within the inner storage volume for detecting characteristics of at least one of the fluid(s), fluid layer(s) and fluid interphase(s) within the inner storage unit.

In one aspect of the subsea storage system the monitoring system may comprise at least two sensors located adjacent to opposite vertical sides for detecting characteristics of at least one of the fluid(s), fluid layer(s) and fluid interphase(s) within the inner storage volume.

In one aspect the monitoring system may comprises a plurality of sensors preferably displaced vertically adjacent to a vertical side for detecting characteristics of at least one of the fluid(s), fluid layer(s) and fluid interphase(s) at different vertical levels within the subsea storage unit independently.

Hence, the configuration with sensors on opposite sides of the inner storage volume may allow for detection of differences in the vertical levels of phases on opposing sides within the inner storage volume.

In one aspect the monitoring system may comprise a sensor of an acoustic reflector and an acoustic transceiver. Further the monitoring system comprises a transmitter for transmitting data. The acoustic reflector may be located within the inner storage volume for reflecting an acoustic signal. The acoustic transceiver may be adjacent to a vertical side for transmitting and receiving an acoustic signal. The transmitter may transmit data from the at least one acoustic transceiver to the monitoring system for measuring time of flight for an acoustic signal through a fluid within the inner storage volume, wherein the acoustic signal is reflected from the acoustic reflector for detecting different fluid layers and/or fluid interphases within the inner storage volume.

In one aspect the sensor of the monitoring system may comprise a cesium 137 source for emitting gamma rays horizontally through a layer of fluid within the inner storage volume, and a gamma ray receiver for detecting gamma rays located adjacent to the vertical side or within the inner storage volume. Further the monitoring system may comprise a transmitter for transmitting data from the gamma ray receiver to the monitoring system for detecting different fluid layers and/or fluid interphases within the inner storage volume.

In one aspect the senor of the monitoring system may be an inductive sensor located adjacent to the vertical side. The monitoring system may further comprise a transmitter for transmitting data from the inductive sensor to the monitoring system for detecting different fluid layers and/or fluid interphases within the inner storage volume.

In one aspect sensor of the monitoring system may comprise an inductive sensor located adjacent to the vertical side or within the inner storage volume. Further, the monitoring system may comprise a transmitter for transmitting data from the inductive sensor to the monitoring system for detecting different fluid layers and/or fluid interphases within the inner storage volume.

In one aspect the monitoring system may comprise a capacitive sensor located adjacent to the vertical side or within the inner storage volume and a transmitter for transmitting data from the capacitive sensor to the monitoring system for detecting different fluid layers and/or fluid interphases within the inner storage volume.

In one aspect the sensor of the monitoring system may comprise an optical sensor within the inner storage volume, and the monitoring system may further comprise a transmitter for transmitting data from the at least one optical sensor to the monitoring system for detecting different fluid layers and/or fluid interphases within the inner storage volume.

The person skilled in the art will understand that the subsea storage unit may comprise one or a plurality of monitoring systems.

In one aspect the fluid conduit of the subsea storage unit may comprise the sensor of the monitoring system being a flow meter for measuring and collecting data of the fluid's flowrate, wherein the fluid conduct further comprises a transmitter for transmitting data from the flow meter to the monitoring system, and a remote controlled valve comprising a receiver connected to the monitoring system. The remote controlled valve may be configured to receive a signal from said monitoring system and for adaptively control the flowrate of the storage fluid into the inner storage volume.

In one aspect the subsea storage system may further comprise a fluid conduit fluidly connected to the at least one maintenance opening and fluidly connectable to a surface installation. Further, the fluid conduit may comprise a flow meter, a transmitter and a remote controlled valve. The flow meter may measure and collect data of the fluid flowrate. The transmitter may transmit the data from the flow meter to the monitoring system. The remote controlled valve may comprise a receiver connected to the monitoring system, wherein the remote controlled valve is configured to receive a signal from said monitoring system and for adaptively control the flowrate of fluid into or out of the inner storage volume.

In one embodiment the present invention concerns a method for maintenance of the subsea storage system having a subsea storage unit and a monitoring system according to any one of the aspects mentioned above. The method may comprise the steps of:

A. using the monitoring system for collecting data and determining at least one of the following:
   the volume of at least one fluid,
   the flowrate of at least one fluid,
   the vertical level of at least one fluid interphase, and the fraction of emulsified barrier fluid with seawater relative to total amount of barrier fluid.

The method may further comprises the steps of:

B. using the monitoring system to identify a barrier fluid and/or emulsified barrier fluid in need of maintenance, C. evacuating the barrier fluid and/or emulsified barrier fluid from the inner storage volume via the lower section opening or the upper section opening, and D. adding fresh barrier fluid to the inner storage volume via the lower section opening or the upper section opening from a surface installation.

In one aspect the method for maintenance of the subsea storage system may comprise a fluid conduit fluidly connected to the at least one maintenance opening. The fluid conduit may further be fluidly connectable to a surface installation. Further, the fluid conduit may comprise at least one flow meter for measuring and collecting data of fluid flowrate and at least one transmitter for transmitting data from the at least one flow meter to the monitoring system.

The fluid conduit may further comprise a remote controlled valve comprising a receiver connected to the monitoring system. The remote controlled valve may be configured to receive a signal from said monitoring system and for adaptively control the flowrate of fluid into or out of the inner storage volume.

Additionally, in the aspect that the subsea storage unit of the subsea storage system comprises at least one maintenance opening for fluid connection from the inner storage volume to the outside of the subsea storage unit and/or the subsea storage unit comprises at least one maintenance fluid conduit for fluid connection from the inner storage volume to the outside of the subsea storage unit, the method may further comprise the steps of:

E. using the monitoring system to identify a barrier fluid and/or emulsified barrier fluid in need of maintenance, F. adjusting the level of said barrier fluid and/or emulsified barrier fluid for vertical alignment with the at least one maintenance opening by introducing seawater or storage fluid into the inner storage volume, G. evacuating a predetermined volume of said barrier fluid and/or emulsified barrier fluid from the inner storage volume via the at least one maintenance opening to a surface installation, H. adding a predetermined volume of fresh barrier fluid via the at least one maintenance opening from a surface installation.

In one aspect the for maintenance of a subsea storage system may further comprise the steps of:

I. analyzing the data collected by the monitoring system in step A by using the data processor for verifying that the barrier fluid layer is extending across the entire cross section of the inner storage volume, J. using the monitoring system for transmitting a signal to a fluid conduit valve for automatically adapting flowrates for filling and emptying storage fluid for securing that the barrier fluid layer extends across the entire cross section of the inner storage volume during filling or emptying of storage fluid.

The term "annulus" as used herein defines the space between two concentric objects for example the outer wall and the inner wall.

The term "time of flight" as used herein refers to the time that elapses between emittance of a signal and detecting of the same signal.

The term "barrier fluid" as used herein refers to a fluid that is immiscible and distinct from the storage fluid and seawater.

The term "specific gravity" (SG) as used herein is a dimensionless unit defined as the ratio of the density of a substance to the density of water—at a specified temperature. The term "Specific gravity" as used herein has the same meaning as "relative density" and can be expressed as $$SG = \rho_{substance}/\rho_{H2O}$$

where

SG=Specific Gravity of the substance $\rho_{substance}$=density of the fluid or substance [kg/m$^3$]

$\rho_{H2O}$=density of water—normally at temperature 4° C. [kg/m$^3$]

The term "bara" as used herein is the pressure reading relative to absolute vacuum.

The term "detecting characteristics" used herein should be understood as detecting one of the characteristics of one of the fluid(s), fluid layer(s) and fluid interphase(s) which characteristics may include at least one of volume, thickness, the location defined by the vertical extent of the inner storage volume, flowrate, density and chemical composition including pH.

The term "fluid" should be understood as at least one of storage fluid, barrier fluid, emulsion fluid and seawater.

The term "fluid layer" should be understood as a layer of a fluid extending horizontally across the entire inner storage volume.

The term "fluid interphase" should be understood as the interphase between two fluid layers.

DETAILED DESCRIPTION OF THE INVENTION

In the following, specific embodiments of the invention will be described in more detail with reference to the drawings. However, the invention is not limited to the embodiments and illustrations contained herein. It is specifically intended that the invention includes modified forms of the embodiments, including portions of the embodiments and combinations of elements of different embodiments. It should be appreciated that in the development of any actual implementation, as in any engineering or design project, specific decisions must be made to achieve the developer's specific goals, such as compliance with system and/or business related constraints. Moreover, it should be appreciated that such a development effort might be complex and time consuming, but would nevertheless be a routine undertaking of design, fabrication and manufacture for the skilled person having the benefit of this disclosure.

Figure 1:
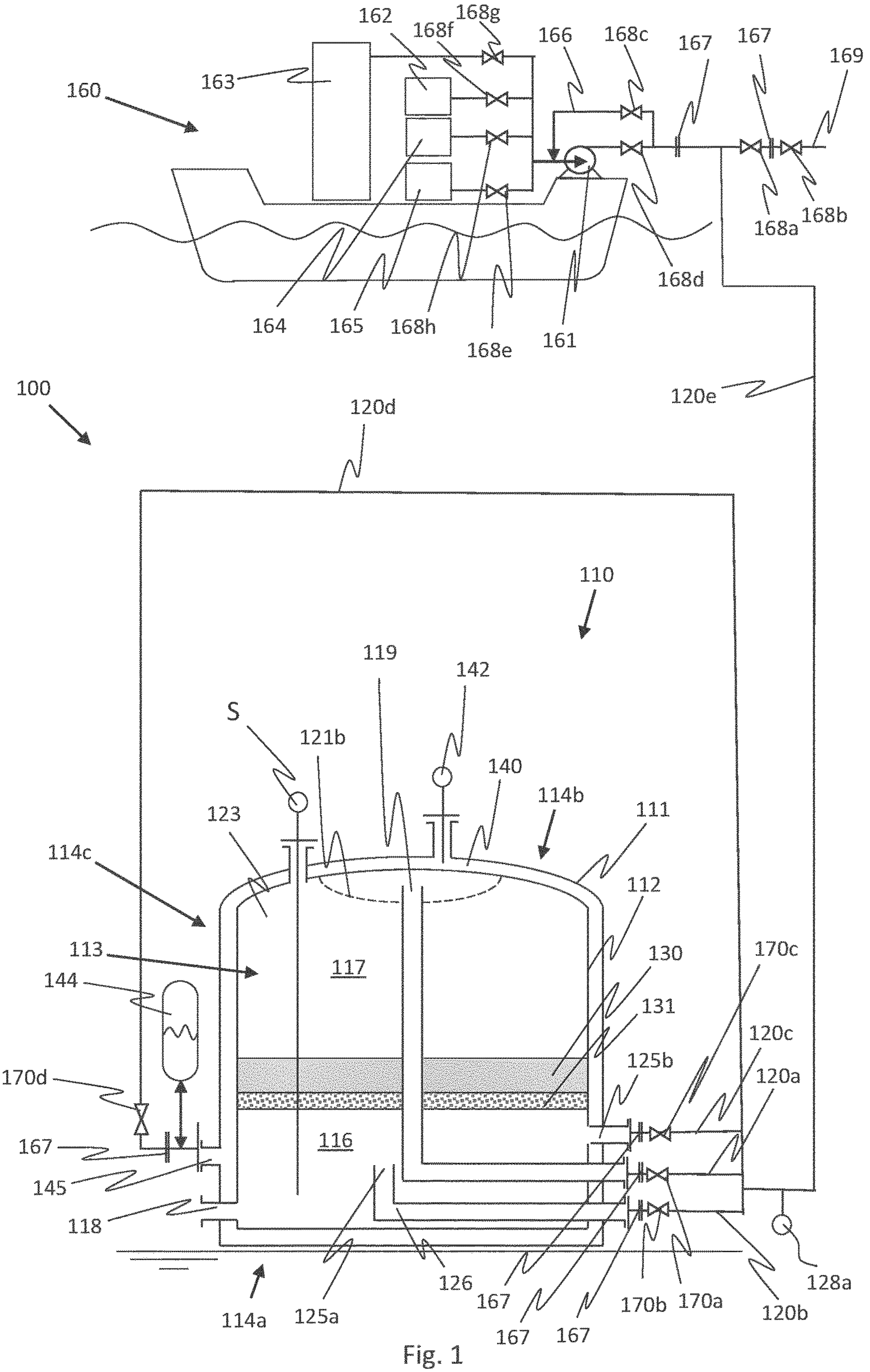
FIG. 1: Shows a schematic view of a subsea storage unit with a barrier fluid between storage fluid in an upper storage section, seawater in an lower storage section and an emulsified layer of barrier fluid and seawater. The subsea storage unit is shown with fluid conduits connected to the openings and connected to a single fluid conduit that extends to a surface installation.

FIG. 1 shows an embodiment of a subsea storage system 100 comprising surface installation 160 and a subsea storage unit 110 comprising a barrier fluid 130 according to the invention. The barrier fluid 130 is for separating storage fluid 123 and seawater within an inner storage volume 113.

The storage fluid 123 is typically an energy containing fluid suitable for use as fuel, for example liquid ammonia.

The surface installation 160 may be floating at the sea surface, for example a ship, and comprises a tank for storage fluid 163, a tank for fresh barrier fluid 162, a tank for used barrier fluid 164 and a tank for annulus fluid 165. The tanks 162, 163, 164, and 165 are fluidly connected via fluid conduits comprising respective valves 168*f*, 168*g*, 168*h*, 168*e* for controlling the flow of fluids, to a fluid conduit 120*e* which extends down to the subsea storage unit 110. Between the valves 168*f*, 168*g*, 168*h*, 168*e* and the fluid conduit 120*e* a pump 161 is set up for pumping fluids. Between the pump 161 and the fluid conduit 120*e* a valve 168*d* is placed in order to control flow from the fluid conduit 120*e* into the 161. The skilled person will acknowledge that pumps may also be installed subsea on one or more of fluid conduits 120*a*, 120*b*, 120*c* and 120*d* for pumping fluids.

It is also envisaged other variants of surface installations 160 that could use storage fluid 123 provided from the subsea storage unit 110 or provide storage fluid 123 to the subsea storage unit 110. Examples include land-based installations for example located at a quay or a platform installation located at sea.

The surface installation 160 may be provided with a fluid conduit fluidly connected to the subsea storage unit 110 for transfer of storage fluid 123.

The subsea storage unit 110 may be fed storage fluid 123 from a surface installation 160 by means of a riser. If the storage fluid is liquid ammonia ($NH_3$), the base case is to pressurize cryogenic $NH_3$ liquid from the surface installation 160 and heat it to 0 degrees C. by means of a heat exchanger, preferably taking thermal power from the tankers' turbine/engine exhaust, before transferring the $NH_3$ subsea.

When pumps are installed subsea there may be need for a pump 161 bypass conduit 166 with a valve 168*c* which provides means for bypassing fluids around the pump 161 to the fluid conduit 120*e*. A fluid conduit coupling 167 is located between the valves 168*c*, 168*d* and the fluid conduit 120*e* which allows the surface installation 160 to disconnect from the fluid conduit 120*e*.

A fluid conduit for external connection 169 allows for connection to a second surface installation (not shown) for example for loading of storage fluid 123. A valve 168*b*, a fluid conduit coupling 167 and a valve 168*a* are located between the fluid conduit for external connection 169 and the fluid conduit 120*e*. Such an arrangement for external connection allows a second surface installation the flexibility to connect, load or unload storage fluid 123 and disconnect.

All valves 168*a*-168*h* may be manual or automatic, for example configured to operate via a data signal for example from a data processor 155 (not shown).

The fluid conduit 120*e* is shown comprising a flow meter 128*a* located subsea adjacent to the subsea storage unit 110. The flow meter 128 allows for control of the volume of fluid that passes through the fluid conduit 120*e* per time unit.

The subsea storage unit 110 comprises a wall 112 defining an inner storage volume 113. The inner storage volume 113 comprises a top side 114*b*, a vertical side 114*c* and a bottom side 114*a*. The subsea storage unit 110 further comprises an outer wall 111. This provides the subsea storage unit 110 with a double wall with an annulus 140 between the wall 112 and the outer wall 111. The annulus 140 is filled with an annulus fluid.

The inner storage volume 113 is suitable for storing a storage fluid 123. The storage fluid 123 is separated from seawater by a layer of barrier fluid 130. The inner storage volume 113 comprises a lower section 116 which extends from the bottom side 114*a* up to the barrier fluid 130 and an upper section 117 which extends down from the top side 114*b* to the barrier fluid 130. The upper section 117 comprises an upper section opening 119 that is for loading and unloading the inner storage volume 113 for example with storage fluid 123. To make loading and unloading the inner storage volume 113 possible it must be pressure compensated. This is obtained by providing the inner storage volume 113 with a lower section opening 118 which makes the inner storage volume 113 fluidly connected to the ambient sea.

When storage fluid 123 is added to the upper section 117, seawater is pushed out of the lower section opening 118 and as the volume of storage fluid 123 within the inner storage volume 113 increases, the layer of barrier fluid 130 is pushed down towards the inner storage volume bottom side 114*a*. The barrier fluid constantly extends horizontally across the entire inner storage volume 113 in order to separate the storage fluid 123 and seawater.

Now turning back to the fluid connections showed in FIG. 1. The fluid conduit 120*e* is fluidly connected to a fluid conduit 120*d* which is fluidly connected to an annulus opening 145 for filling or emptying the annulus 140 of annulus fluid. The fluid conduit 120*d* comprises a remote controlled valve 170*d*. An accumulator 144 is fluidly connected to the annulus opening 145 and the accumulator 144 is configured to maintain pressure within the annulus 140 over time. A fluid conduit coupling 167 is located between the valve 170*d* and the annulus opening 145 which allows for disconnection of the fluid conduit 120*d* from the subsea storage unit 110.

The fluid conduit 120*e* is also fluidly connected to fluid conduit 120*a* which comprises a remote controlled valve 170*a*. Fluid conduit 120*a* is fluidly connected to the upper section opening 119. The fluid conduit 120*a* is configured to allow loading and unloading of storage fluid 123 from the subsea storage unit 110 through the upper section opening 119.

The fluid conduit 120*e* is also fluidly connected to a fluid conduit 120*b* which comprises a remote controlled valve 170*b*. The fluid conduit 120*b* is fluidly connected to a maintenance opening 125*a*. As shown the maintenance opening 125*a* is located within the storage volume 113 at a maintenance fluid conduit end 127 of a maintenance fluid conduit 126 fluidly connected to the fluid conduit 120*b*. The end 127 being distal from the fluid connection between the fluid conduit 120*b* and the maintenance fluid conduit 126.

The maintenance opening 125*a* is located between 10-90% of the vertical extent of the inner storage volume 113 below the top side 114*b*.

The fluid conduit 120*e* is further fluidly connected to a fluid conduit 120*c* which comprises a remote controlled valve 170*c* and is fluidly connected to a second maintenance opening 125*b*.

The maintenance openings 125*a*, 125*b* are suitable for adding or evacuating barrier fluid 130 and emulsified barrier fluid 131 from the subsea storage unit 110. This allows for maintenance of the barrier fluid 130 in order to sustain an effective barrier between storage fluid and seawater within the subsea storage unit 110. The maintenance can be performed while the subsea storage unit 110 is located subsea, for example at the sea floor, and in operation.

All valves 170*a*-170*d* may be remote controlled and automatic, for example configured to operate via a data signal for example from a data processor 155 (not shown).

The subsea storage unit 110 comprises an annulus detector 142 for detecting storage fluid 123 if leaked into the annulus 140. The detector may for example be a pH meter in the case where storage fluid 123 is $NH_3$. Leakage of $NH_3$ from the inner storage volume 113 into the annulus 140 would easily be detected since said $NH_3$ would cause a change in pH that would be detected by the detector. The annulus detector 142 may comprise a transmitter configured to transmit a signal to data processor 155 (not shown).

Figure 2:
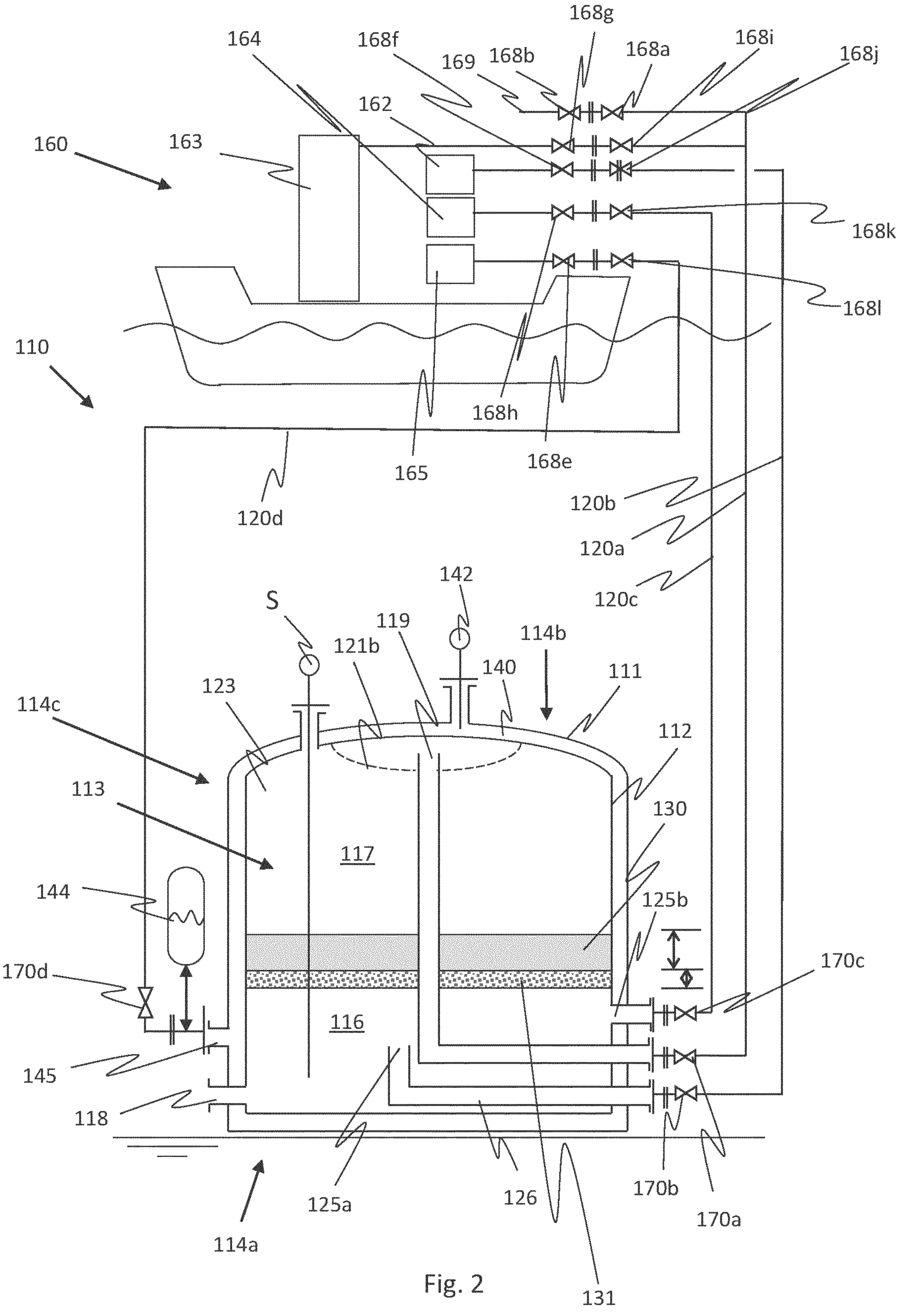
FIG. 2: Shows a schematic view of a subsea storage unit with fluid conduits connected to the openings and extending to a surface installation.

FIG. 2 shows a second embodiment with an alternative way of fluidly connecting the surface installation 160 with the subsea storage unit 110. The surface installation comprises a tank for storage fluid 163, a tank for fresh barrier fluid 162, a tank for used barrier fluid 164 and a tank for annulus fluid 165.

The tank for storage fluid 163 is fluidly connected to the subsea storage unit 110 via a fluid conduit 120*a* which comprises valves 168*g*, 168*i* and a fluid conduit coupling 167 between said valves 168*g*, 168*i* for breaking the fluid connection from the tank for storage fluid 163 to the subsea storage unit 110. The fluid conduit 120*a* further comprises a remote controlled valve 170*a* and a fluid conduit coupling 167 between said remote controlled valve 170*a* and the upper section opening 119 for breaking the fluid connection from the fluid conduit 120*a* to the upper section opening 119.

The tank for fresh barrier fluid 162 is fluidly connected to the subsea storage unit 110 via a fluid conduit 120*b* which comprises valves 168*f*, 168*j* and a fluid conduit coupling 167 between said valves 168*f*, 168*j* for breaking the fluid connection from the tank for fresh barrier fluid 162 to the subsea storage unit 110. The fluid conduit 120*b* further comprises a remote controlled valve 170*b* and a fluid conduit coupling 167 between said remote controlled valve 170*b* and the maintenance opening 125*a* breaking the fluid connection from the fluid conduit 120*b* to the maintenance opening 125*a*.

The tank for used barrier fluid 164 is fluidly connected to the subsea storage unit 110 via a fluid conduit 120*c* which comprises valves 168*h*, 168*k* and a fluid conduit coupling 167 between said valves 168*h*, 168*k* for breaking the fluid connection from the tank for used barrier fluid 164 to the subsea storage unit 110. The fluid conduit 120*c* further comprises a remote controlled valve 170*c* and a fluid conduit coupling 167 between said remote controlled valve 170*c* and the maintenance opening 125*b* for breaking the fluid connection from the fluid conduit 120*b* to the maintenance opening 125*b*.

The tank for annulus fluid 165 is fluidly connected to the subsea storage unit 110 via a fluid conduit 120*d* which comprises valves 168*e*, 1681 and a fluid conduit coupling 167 between said valves 168*e*, 1681 for breaking the fluid connection from the tank for annulus fluid 165 to the subsea storage unit 110. The fluid conduit 120*d* further comprises a remote controlled valve 170*d* and a fluid conduit coupling 167 between said remote controlled valve 170*b* and the annulus opening 145 for breaking the fluid connection from the fluid conduit 120*d* to annulus opening 145.

The subsea storage unit 110 is identical for the first and second embodiment.

Properties of the annulus fluid: The annulus fluid must be different from the storage fluid 130 and is preferably seawater or barrier fluid 130.

The storage fluid 123 has a specific gravity that is lower than the barrier fluid and is immiscible with said barrier fluid 130 may be suitable. This ensures that the storage fluid 123 floats on top of the barrier fluid 130 within the inner storage volume 113.

The subsea storage unit 110 is suitable for storing several different storage fluids. One preferred storage fluid 123 is liquid ammonia ($NH_3$). However, the skilled person acknowledges that other storage fluids that has a specific gravity above the barrier fluid and is immiscible with said barrier fluid 130 may be suitable for storage in a storage unit according to the present invention.

The barrier fluid 130 must be immiscible with seawater and the storage fluid 123. The barrier fluid 130 must have a specific gravity between seawater and the storage fluid 123 in order to form a layer between said seawater and storage fluid 123.

The barrier fluid 130 is in one preferred embodiment an oily fluid for example biodiesel or a vegetable oil, such as canola oil or olive oil or any blends thereof.

In another preferred embodiment the barrier fluid 130 comprises hydrocarbons with a molecule structure having a carbon number C11 or higher, and with a specific gravity lower than seawater.

It is preferred that the barrier fluid 130 is a fluid with low environmental impact.

Typically, after some time of operation barrier fluid 123 will form an emulsion with seawater at the interface between the barrier fluid 130 and seawater. Emulsified barrier fluid 131 is not effective for keeping storage fluid 123 and seawater separate, thus it is important to ensure that the layer of barrier fluid 130 extending horizontally across the entire inner storage volume is thick enough to avoid penetration and mixing of storage fluid 123 and seawater.

Figure 3:
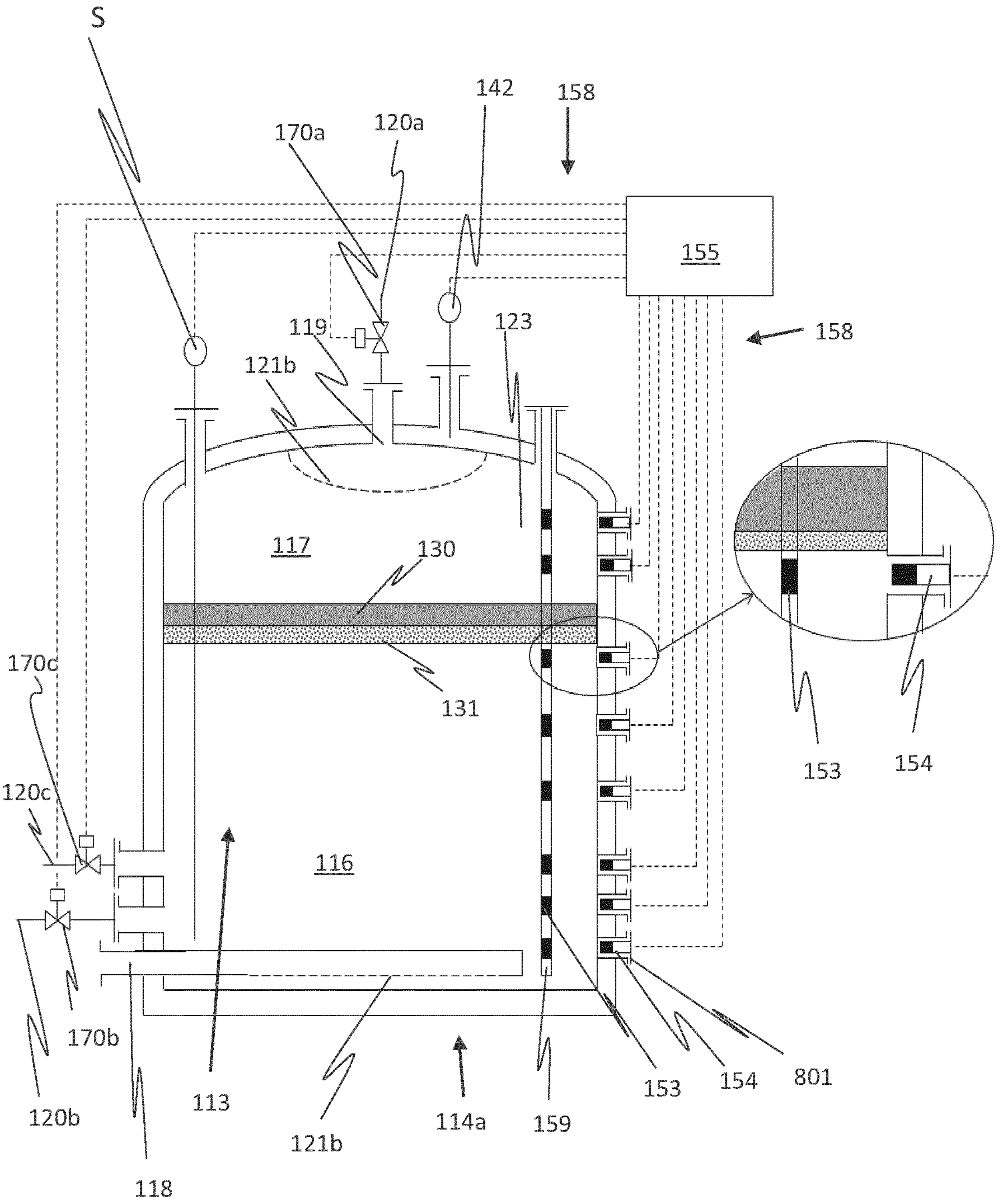
FIG. 3: Shows a schematic view of a subsea storage unit with a vertical stack of cesium 137 gamma-ray emitters and corresponding gamma-ray receivers which are connected to a data processor and a second sensor at the opposite side of the subsea storage unit also connected to the data processor. Remote controlled valves for controlling flow through conduits are also shown connected to the data processor.

As best shown in FIGS. 3-8 the subsea storage unit 110 comprises a monitoring system 150. The monitoring system 150 comprises at least one sensor S configured to transmit and/or receive signals. The sensor S are typically instruments for discrimination between the barrier fluid 130 phase, emulsified barrier fluid 131 phase, the water phase and the storage fluid 123 phase within the inner storage volume 113. Applicable sensors S are described in the following:

FIG. 3 shows a setup for nucleonic phase detection. Both volume management and barrier fluid 130 management depend on the ability to determine the vertical level of all the 4 phases within the inner storage volume 113.

One system which is well established and proven in a subsea context utilizes the capability of Cesium 137 radiation to penetrate most materials. Cesium 137 radiates gamma rays which is absorbed/scattered in any medium it penetrates. The signal loss is essentially proportional to the density of the materials through which the radiation travels.

A vertical pipe 159 comprising an array of Cesium 137 sources 153 may be arranged to produce several gamma rays horizontally in the tank and focused to hit a gamma ray receiver 154 located at the same vertical level as a corresponding Cesium 137 source 153. The gamma ray receiver 154 may be located in a recess of outer wall 111 or in a second vertical pipe located within the inner storage volume 113 (not shown).

Depending on the density of the liquid phase traversed the radiation will lose an amount of energy. The difference in loss of energy may be detected and represent the difference in fluid density. Thus, allowing for determining which fluid phase the gamma rays has traversed based on the known density of the fluid phases within the inner storage volume 113.

The pipe 159 could beneficially run the full height of the inner storage volume 113 or at least 90% of the vertical extent of the inner storage volume 113. It is not required to be maintained. The life-time and reliability of Cesium 137 sources are very high. Cesium 137 has a half-life of 30.5 years and the loss over time of radiation is exponential and entirely predictable.

Each emitter 153 radiates a stream of gamma rays, which penetrate the wall of pipe 159, penetrates whichever liquid phase is present storage fluid 130, emulsified storage fluid 131, 123 or seawater, and hits the gamma ray receiver 154 which contains a receiving Geiger Mueller tube. The gamma ray receiver 154 could be located in a (partial) window in the inner wall 112 and the receiving unit could beneficially be connected (connector not shown) to the outer wall 111 and sealed to it such as to maintain the pressure containment with two mechanical barriers, the wall 112 and the outer wall 111. A pipe 801 could be organized to isolate the receiver unit 154 from the annulus volume 140.

The receiver unit 154 may be retrieved from the tank assembly for maintenance during operation of the subsea storage system 100.

FIG. 3 also shows that the subsea storage unit 110 comprises a second assembly of sensors (S) adjacent to the vertical side 114*c* on the opposite side of the inner storage volume 113 with reference to the assembly of nucleonic phase detectors described above. The second assembly of sensors (S) may be identical to the assembly of to the assembly of nucleonic phase detectors described above. This configuration with sensors on opposite sides of the inner storage volume 113 allows for detection of differences in the vertical levels of phases on opposing sides within the inner storage volume 113. For example differences in the thickness of the layer of emulsified barrier fluid 131.

FIG. 3 also shows a fluid distributor 121*b* located in the proximity of both the upper section opening 118 and the lower section opening 119 for preventing disruption of the barrier fluid 130 layer by breaking up the flow of fluids to or from said openings.

The annulus detector 142 may for example be a pH meter for detecting storage fluid 123 that changes pH on the annulus fluid if they mix.

Also shown is a data processor 155 which is part of the monitoring system 150. The data processor 155 is configured to receive data signals 158, shown as dotted lines external to the subsea storage unit in FIGS. 3-5, process the data and send data signals to components of the subsea storage system 100 such as remote controlled valves 170*a*-170*d*, for example instructions for opening or closing the valves in response to measured vertical levels for the fluid phases within the inner storage volume 113. The sensors (S), the remote controlled valves 170*a*-170*d*, the annulus detector 142 and the gamma ray receivers 154 are shown connected to the data processor 155.

Figure 4:
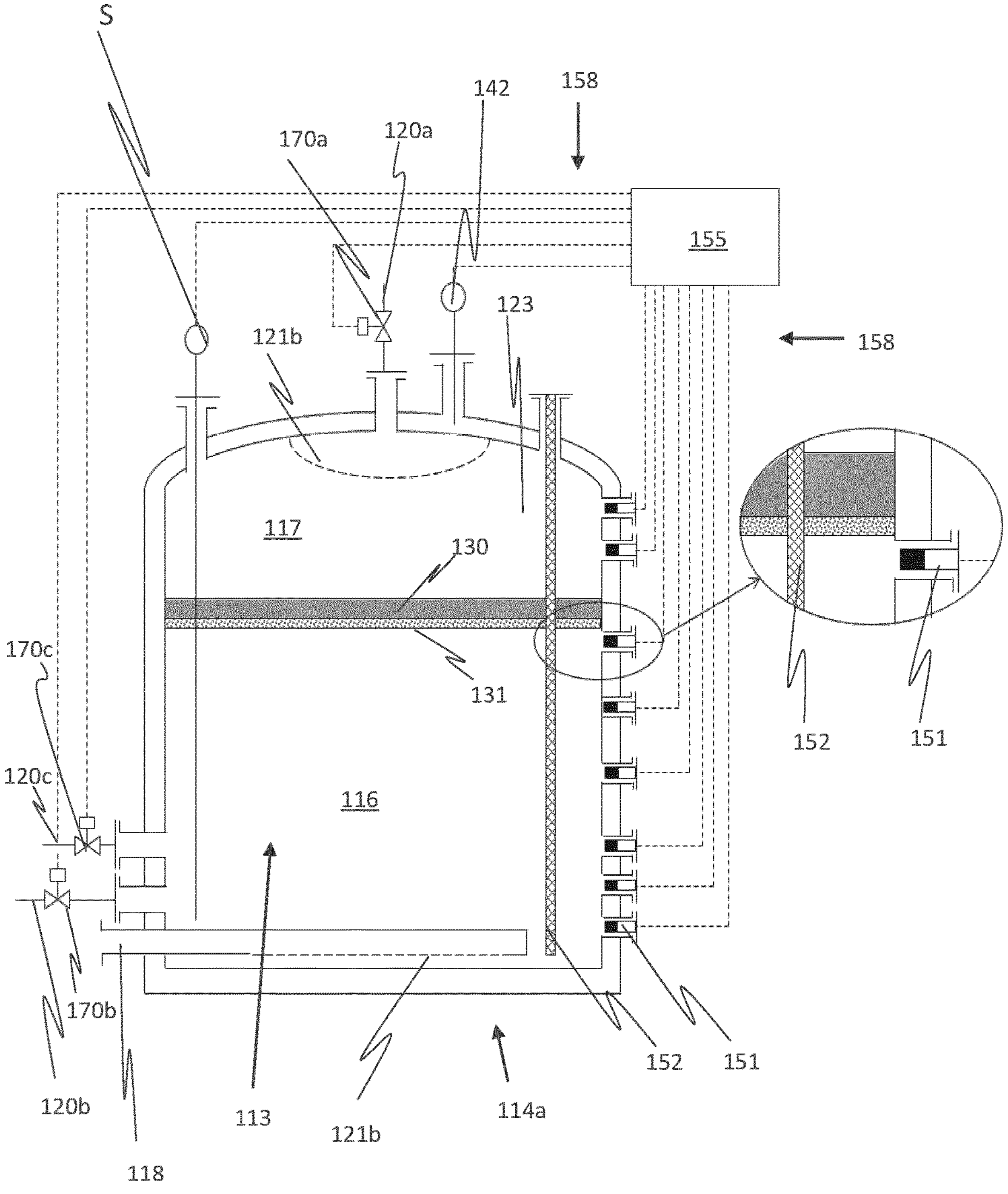
FIG. 4: Shows a schematic view of the subsea storage unit with acoustic transceivers and an acoustic reflector plate. The acoustic transceivers are connected to the data processor.

FIG. 4 shows an acoustic fluid discrimination system for a subsea storage unit 110.

The basic principle of the acoustic fluid discrimination system is to mount a vertical stack of acoustic transceivers along the vertical side 114*c* wall of the inner storage volume 113 and radiate the inner storage volume 113 with a single burst of acoustic energy which is reflected by an acoustic reflector 152 such as a simple vertical steel plate mounted inside of the inner storage volume 113. Only one acoustic transceiver 151 is activated at any time. The time-of-flight of the acoustic energy to travel horizontally from the transceiver 151 through the fluid, be reflected from the acoustic reflector 152 and make it back to the transceiver 151 for detection, is a function of the density of the fluid through which the sound wave travels.

The simplest software is associated with locating the transceivers 151 inside of the inner storage volume 113. It is also possible to mount the transceivers 151 externally on the subsea storage unit 110, for instance in acoustic contact with a steel rod running through the annulus 140 and acoustically connecting the externally mounted transceiver 151 with the inner storage volume 113. This arrangement is more demanding in terms of signal processing in view of the multiple reflections which must be filtered out to identify the wave reflected from the acoustic reflector 152, but in terms of maintenance it offers significant benefits. This arrangement offers replacement of one acoustic transceiver 151 at the time and during full operation of the subsea storage system 100.

FIG. 4 also shows that the subsea storage unit 110 comprises a second assembly of sensors (S) adjacent to the vertical side 114*c* on the opposite side of the inner storage volume 113 with reference to the assembly of acoustic transceivers 151 and acoustic reflector 152 described above. The second assembly of sensors (S) may be identical to the assembly of acoustic transceivers 151 and acoustic reflector 152. This configuration with sensors on opposite sides of the inner storage volume 113 allows for detection of differences in the vertical levels of phases on opposing sides within the inner storage volume 113. For example, differences in the thickness of the layer of emulsified barrier fluid 131.

Also shown in FIG. 4 is the data processor 155 which is part of the monitoring system 150. The sensors (S), the remote controlled valves 170a-170d, the annulus detector 142 and the acoustic transceivers 151 are shown connected to the data processor 155.

From an electrical point of view seawater is a semiconductor. The conductivity is in order of 5 siemens/meter. For practical purposes the conductivity of $NH_3$ and barrier fluid 130 may be considered to be zero. The emulsion phase has an uncertain value of electrical conductivity and any value measured could depend on the method of measurement. $NH_3$ is a preferred storage fluid 130, but the skilled person acknowledges that the same principle can be used for other storage fluids 130 which have conductivities that can be considered zero. The differences in conductivity of the different fluid phases may be used to discriminate between them by use of inductive sensors.

Inductive sensors 156 which have been developed and successfully operated to identify the water phase and the emulsion phases in a subsea separator. Typically, a low excitation voltage of frequency higher than 5 Mhz (can be substantially higher, but 5 Mhz is sufficient) is fed to an electric coil of only a few windings. The coil may typically be wound on a ferrite core of E-shape such as to direct the high frequency magnetic field to the volume in front of the coil. When a conductive/semiconductive fluid is penetrated by the magnetic field energy is consumed by the fluid by generation of eddy currents in the fluid. The loss of power to the fluid materializes as a load on an excitation oscillator. The loading may be detected as an increase in current or by phase angle between voltage and current. The discrimination between the fluids is very easily detected, as the difference in conductivity can be as high as 10 exp(7).

If at least one such inductive sensor 156 is located on the inside of the inner tank wall in a position to inject a high frequency magnetic field into the fluid, then at least the top of the water phase will be detected as it passes the sensor location. In practical systems the emulsion layer has also been successfully and consistently detected, although with less discrimination.

Figure 5:
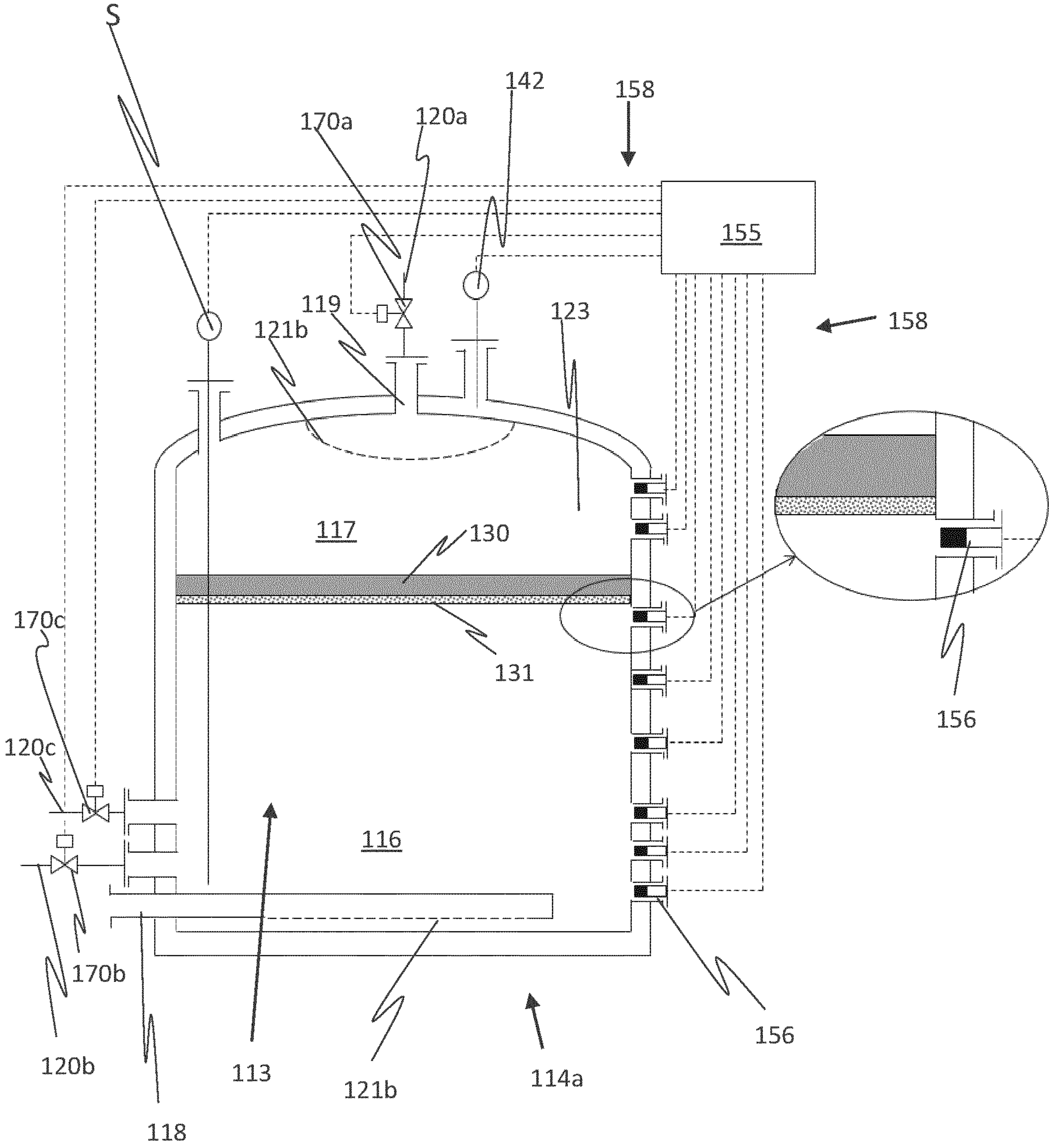
FIG. 5: Shows a schematic view of the subsea storage unit with inductive sensors connected to the data processor.

FIG. 5 shows inductive sensors 156 that are mounted in a vertical stack along the vertical side 114c wall of the inner storage volume 113. The inductive sensors 156 must either be in contact with the fluids inside the inner storage volume 113 or separated from it by a non-conducting material of limited thickness, e.g. as a window in the tank wall to function and is configured to discriminate between the different phases and send a signal to the data processor 155 and thereby indicate the vertical levels of the storage fluid 123, the barrier fluid 130, the emulsified barrier fluid 131 and the seawater.

FIG. 5 also shows that the subsea storage unit 110 comprises a second assembly of sensors (S) adjacent to the vertical side 114c on the opposite side of the inner storage volume 113 with reference to the assembly of the inductive sensor 156 described above. The second assembly of sensors (S) may be identical to the assembly of inductive sensors 156 described above. This configuration with sensors on opposite sides of the inner storage volume 113 allows for detection of differences in the vertical levels of phases on opposing sides within the inner storage volume 113. For example, differences in the thickness of the layer of emulsified barrier fluid 131.

Also shown in FIG. 5 is the data processor 155 which is part of the monitoring system 150. The sensors (S), the remote controlled valves 170a-170d, the annulus detector 142 and the acoustic transceivers 151 are shown connected to the data processor 155.

Figure 6:
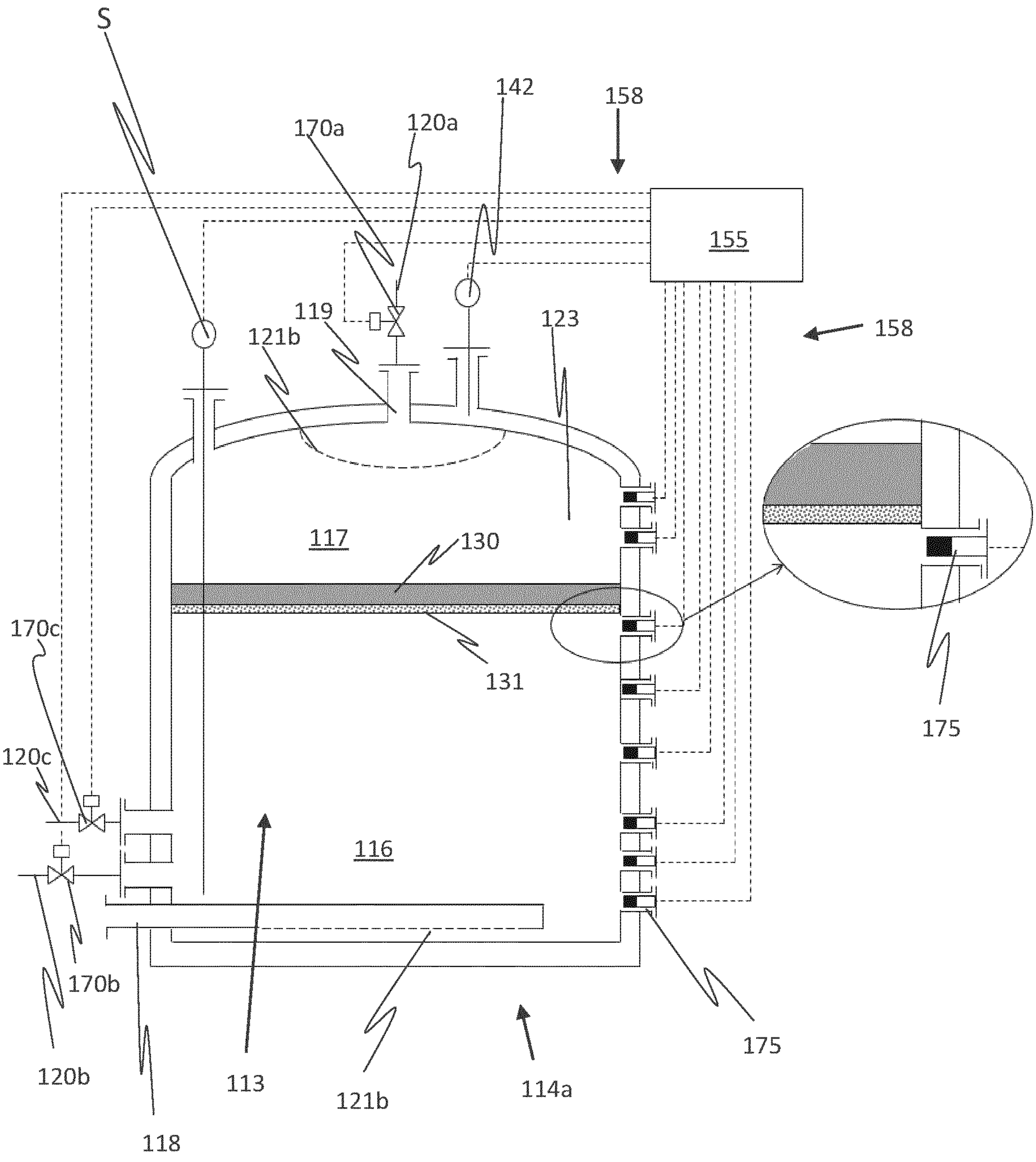
FIG. 6: Shows a schematic view of the subsea storage unit with capacitive sensors connected to the data processor.

FIG. 6 shows capacitive sensors 175 that are mounted in a vertical stack along the vertical side 114c wall of the inner storage volume 113. The working principle is that the volume of fluid inside of the inner storage volume 113 is exposed to an alternating electric field generated between two insulated electrodes making up the probe (facing the fluids) of the capacitive sensor 175. The dielectric constant of the storage fluid 123 is different from that of seawater and the voltage loss in the excitation circuit and/or the electric phase distortion will provide a signal which is an expression of which type of fluid is in the volume in front of the sensor face.

Furthermore, the dielectric constant of the emulsified barrier fluid 131 is also different from both that of storage fluid 123 and that of seawater, such as to facilitate even detection of the emulsion phase. The capacitive sensors 175 are thus able to discriminate between the different phases and send a signal to the data processor 155 and thereby indicate the vertical levels of the storage fluid 123, the barrier fluid 130, the emulsified barrier fluid 131 and the seawater.

FIG. 6 also shows that the subsea storage unit 110 comprises a second assembly of sensors (S) adjacent to the vertical side 114c on the opposite side of the inner storage volume 113 with reference to the assembly of the capacitive sensor 175 described above. The second assembly of sensors (S) may be identical to the assembly of capacitive sensor 175 described above. This configuration with sensors on opposite sides of the inner storage volume 113 allows for detection of differences in the vertical levels of phases on opposing sides within the inner storage volume 113. For example, differences in the thickness of the layer of emulsified barrier fluid 131.

Also shown in FIG. 6 is the data processor 155 which is part of the monitoring system 150. The sensors (S), the remote controlled valves 170a-170d, the annulus detector 142 and the acoustic transceivers 151 are shown connected to the data processor 155.

The processing circuitry and software for processing the data signals will for all embodiments described herein be located in the data processing unit 155

In one aspect at least one optical sensor 157 is located within the inner storage volume 113 for monitoring the vertical levels of the fluid phases. The at least one optical sensor is configured to send data signals to the data processor 155.

A skilled person would acknowledge that one or several different types of sensors 151, 154, 156, 157, 175 can be placed at different vertical levels or at opposite vertical sides of the inner storage volume 113 for detecting the vertical levels of the different fluid phases within the inner storage volume 113. The sensors 151, 154, 156, 157, 175 do not have to be placed at opposite vertical sides, the may be placed along the vertical sides with any suitable radial spacing for detecting varying thickness of fluid layers within the inner storage volume 113.

It can be beneficial to combine sensor systems based on acoustic transceivers 151/acoustic reflector 152 and cesium 137 source 153/gamma ray receiver 154 and/or inductive sensors 156 and/or optical sensors 157 and or capacitive sensors 175 in one subsea storage unit 110.

Figure 7A:
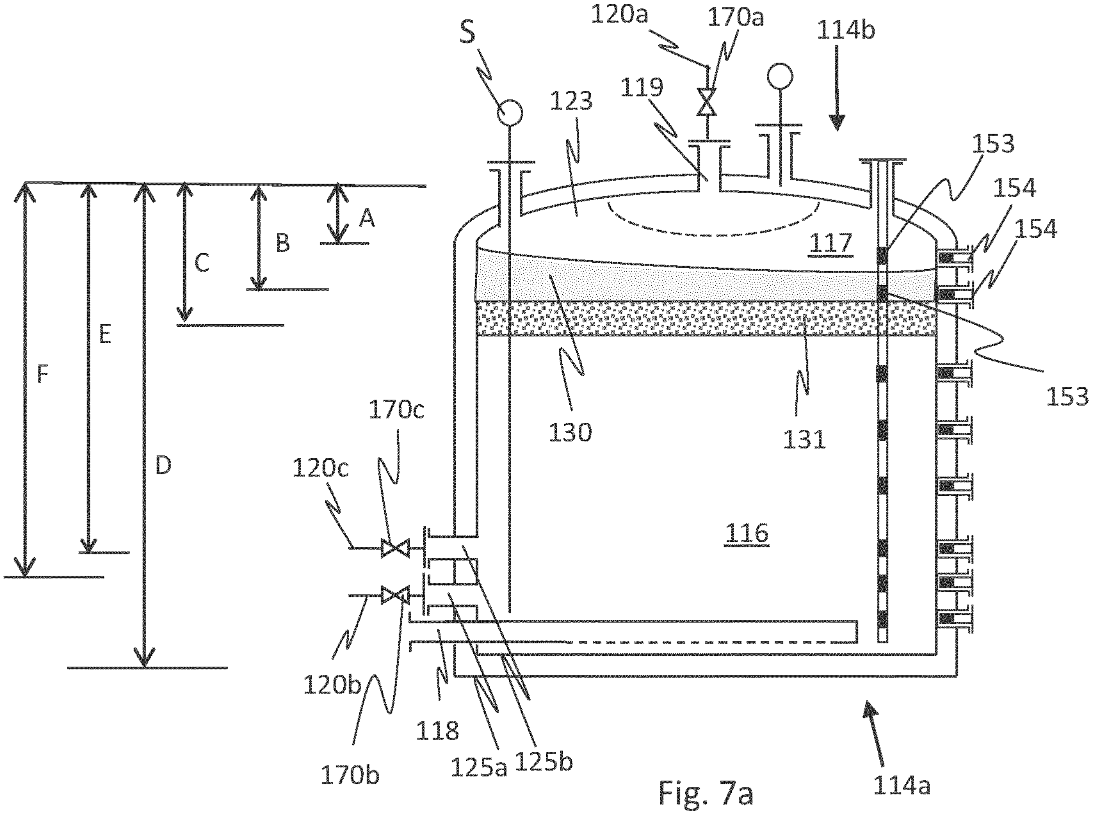
FIG. 7*a*: Shows a schematic view of the subsea storage unit with components and references to different components distance from the top end of the subsea storage unit, i.e. a low volume of storage fluid, where the barrier fluid and emulsified barrier fluid is near the top end and shown with an uneven surface.

FIG. 7a shows the subsea storage unit 110 with a vertical stack of cesium 137 emitters 153 and gamma ray receivers and a second sensor (S) arranged at the opposite vertical side 114c. The subsea storage unit is shown with a small volume of storage fluid 123 and a large volume of seawater within the inner storage volume 113, thus the barrier fluid 130 layer and the emulsified barrier fluid 131 layer is located at a distance A from the top side 114*b* which is close to said top side 114*b*.

The barrier fluid 130 layer is shown with uneven thickness across the horizontal cross section of the inner storage volume 113.

The top of the emulsified barrier fluid 131 is a distance B down from the top side 114*b*.

The bottom of the emulsified barrier fluid 131 is a distance C down from the top side 114*b*.

The total vertical extent of the inner storage volume 113 is denoted with a distance D.

The maintenance opening 125*b* is a distance E down from the top side 114*b*.

Figure 7B:
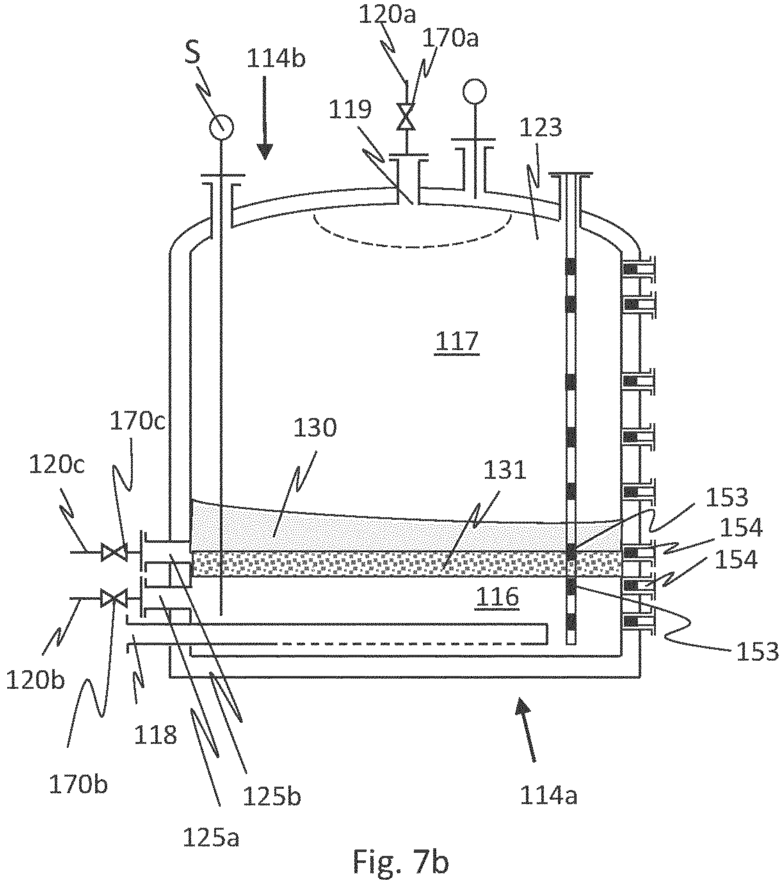
FIG. 7*b*: Shows a view of the subsea storage unit where the barrier fluid and emulsified barrier fluid is near the bottom of the subsea storage unit, i.e. there is a large volume of storage fluid in the subsea storage unit and wherein the barrier fluid and emulsified barrier fluid is aligned with a maintenance opening.

The maintenance opening 125*a* is a distance F down from the top side 114*b* FIG. 7*b* shows the subsea storage unit 110 with the same features as in FIG. 7*a*, but with a large volume of storage fluid 123 and a small volume of seawater within the inner storage volume 113, thus the barrier fluid 130 layer and the emulsified barrier fluid 131 layer is located close to the bottom side 114*a*.

Typically, the subsea storage unit 110 would go from the situation depicted in FIG. 7*a* to the one in 7*b* by being loaded with storage fluid 123.

Such loading of storage fluid will cause the barrier fluid 130 layer and the emulsified barrier fluid 131 layer to travel from the position in FIG. 7*a* close to the top side 114*b* to the position in FIG. 7*b* close to the bottom side 114 *a*. By travelling from the position showed in FIG. 7*a* to the position in showed in FIG. 7*b* the layers of fluid and respective interphases between them pass by the sensors (S) that are vertically displaced adjacent to a vertical side 114*c*. The sensor (S) are configured to discriminate between the different fluids and send a data signal to the data processor disclosing which fluid is detected at a specific. By processing the data signals the data processor will be able to calculate the thickness of the different phases and the vertical location/elevation of the interphases within the inner storage volume 113.

With a view to management of the emulsified barrier fluid 131 layer it is beneficial to define one or more areas i.e. vertical regions in the inner storage volume 113 that will be needing higher density of sensors (S) and thus better resolution of fluid interface position. Such regions will for example be the vertical region where the maintenance opening 125*a*, 125*b* is located, or where the lower section opening (118) is located. An example of such increased density of sensors is that there is typically more than 1 sensors per meter, or more than 2 sensors per meter.

As shown in FIG. 7*b* the emulsified barrier fluid 131 may be vertically aligned with a maintenance opening 125*b* by use of the monitoring system 150 and adding storage fluid 123 to the inner storage volume 113. Emulsified barrier fluid 131 may then be evacuated from the inner storage volume 113 and be replaced with fresh barrier fluid 130.

Figure 8A:
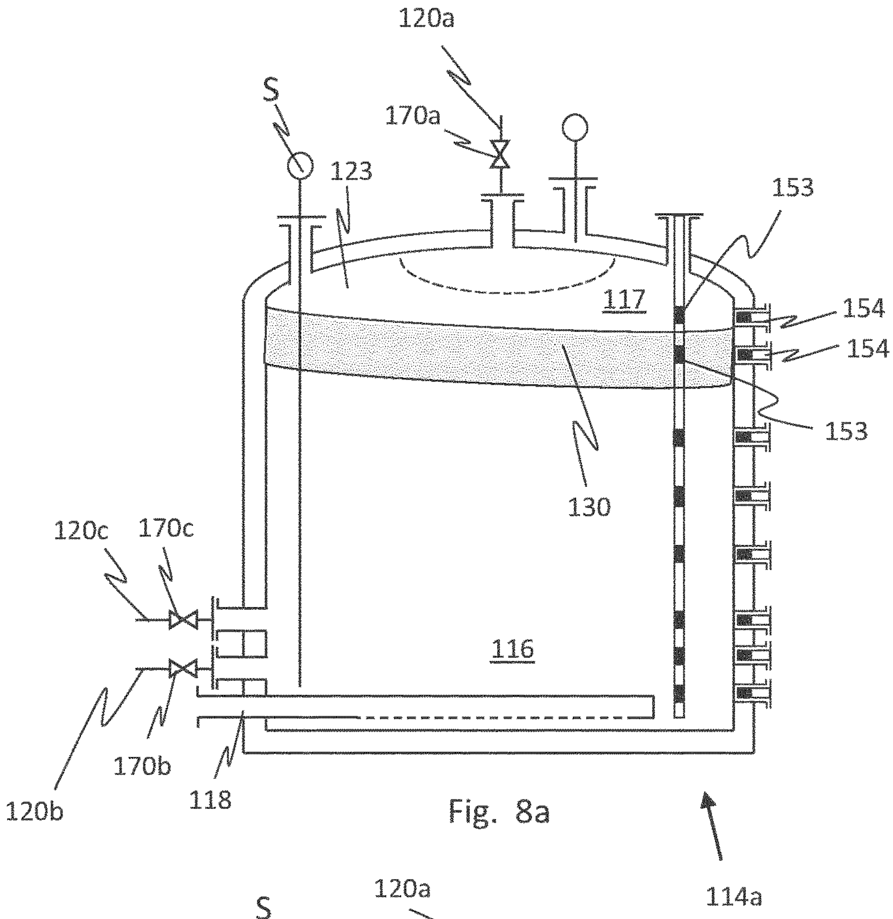
FIG. 8*a*: Shows the subsea storage unit with fresh barrier fluid.
Figure 8B:
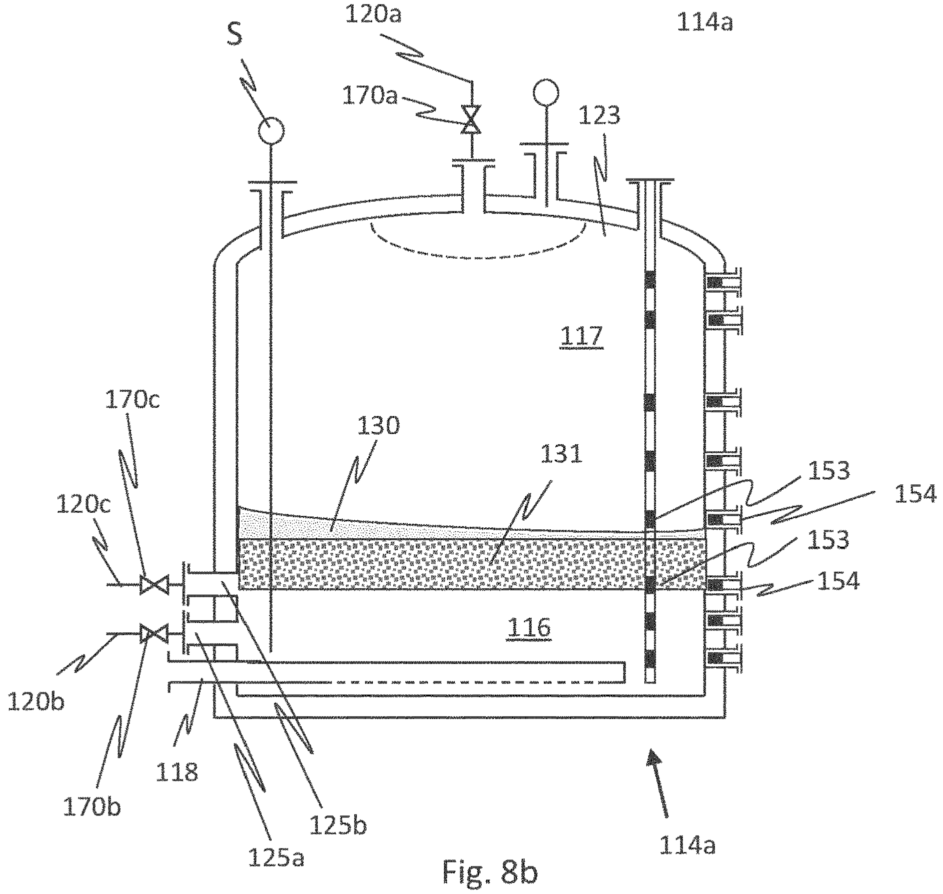
FIG. 8*b*: Shows the subsea storage unit with a thick emulsified barrier fluid layer aligned with a maintenance opening ready for being evacuated from the inner storage volume.

FIG. 8*a* shows the subsea storage unit 110 with a fresh layer of barrier fluid 130 extending across the entire horizontal cross section of the inner storage volume 113. FIG. 8*b* shows the subsea storage unit 110 with a thick layer of emulsified barrier fluid 131 compared to the layer of barrier fluid 130. There is a risk of mixing of the storage fluid with seawater. Maintenance of the barrier fluid 130 is thus due, ie there is need for management of the emulsion.

Figure 9:
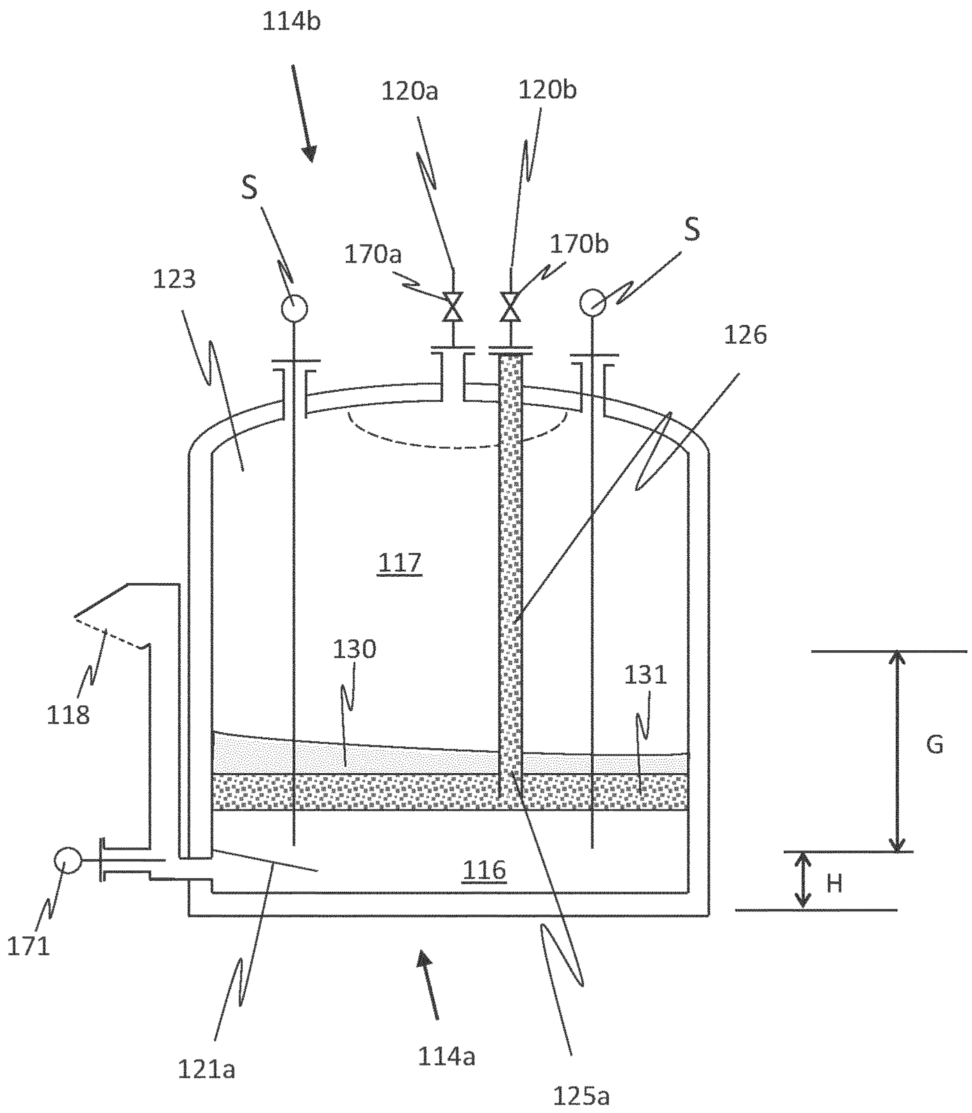
FIG. 9: Shows the subsea storage unit with a fluid deflector at the lower section opening and a protective cap on the lower section opening.

FIG. 9 shows an embodiment of the subsea storage unit 110 where the lower section opening 118 extends via a fluid conduit adjacent to the vertical side 114*c* towards the sea surface. Further, the lower section opening 118 may comprise a screen and/or an overhanging cap cover for shielding from debris that typically sink towards the sea floor. The lower section opening 118 into the lower section 116 is shown a distance H up from the bottom side 114*a*. The lower section opening 118 is shown a distance G higher up from the lower section opening 118 into the lower section 116. The distance G is preferably minimum 1 meter, 2 meter or 3 meter. A fluid reflector 121*a* is located within the lower section 116 for protecting the barrier fluid 130 from fluid flow from the lower section opening 118.

The maintenance fluid conduit 126 is arranged to enter from the top side 114*b* and extends within the inner storage volume 113 to the maintenance opening 125*a*. FIG. 9 shows the emulsified barrier fluid 131 vertically aligned with the maintenance opening 125*a* in the process of being evacuated from the inner storage volume 113.

The lower section opening also comprises a sensor 171, for example a pH meter for detecting changes in pH due to presence of storage fluid 123 in the seawater that is evacuated from the inner storage volume 113.

In one aspect the subsea storage unit 110 comprises an anti-stick surface 124 facing the inner storage volume 113, wherein the surface has a low wettability for at least one, preferably more than one, of the fluids within the inner storage volume 113. The surface 124 may have low wettability for hydrocarbons, liquid ammonia and seawater. This is to limit the mixing of the fluids within the inner storage volume 113 via the wall 112 surface facing the inner storage volume 113. Normally some of the fluid will stick to vertical sides 114*c* as the barrier fluid 130 layers moves up and down within the inner storage volume. Anti-stick surface 124 prevents this. The anti-stick surface may also prevent fouling of the surface facing the inner storage volume 113.

The present invention also relates to a method for maintenance of the subsea storage system 100. The method comprises the step of:

using the monitoring system 150 for collecting data and determining the
- the volumes of fluids,
- flowrates of fluids,
- the vertical levels of fluid interphases, and/or
- the fraction of emulsified barrier fluid 131 with seawater relative to total amount of barrier fluid 130.

Using the data collected by the monitoring system for identifying barrier fluid 130 or emulsified barrier fluid 131 that is in need of maintenance. Evacuating barrier fluid 130 via the lower section opening 118 or the upper section opening 119 by adding storage fluid 123 or seawater to the inner storage volume 113 and adding fresh barrier fluid 130 to the inner storage volume 113.

Another method for maintenance of the barrier fluid 130 comprises the steps:

using the monitoring system 150 for collecting data and determining the
- the volumes of fluids,
- flowrates of fluids,
- the vertical levels of fluid interphases, and/or
- the fraction of emulsified barrier fluid 131 with seawater relative to total amount of barrier fluid 130.

Using the monitoring system to identify barrier fluid 130 and or emulsified barrier fluid 131 in need of maintenance and adjusting the vertical level of said fluid to align with a maintenance opening 125*a*, 125*b* by introducing storage fluid 123 or seawater into the inner storage volume 113.

Evacuating an amount of the barrier fluid 130 or emulsified barrier fluid 131 that needs maintenance and adding fresh barrier fluid 130 to the inner storage volume via the maintenance opening 125*a*, 125*b*.

The method for maintenance may also be automatic. The data collected by the monitoring system is then transmitted by a transmitter to a data processor 155 which is configured to calculate if maintenance is needed. If maintenance is needed the data processor 155 then transmit a signal to the automatic vales 170*a*-170*d* which automatically adapts flowrates through the fluid conduits 120*a*-120*e* for securing that the barrier fluid layer extends across the entire cross-section of the inner storage volume during loading of unloading of storage fluids.

There are several methods available for installation of a large subsea tank system. One method would involve transport to the installation site on a barge and installation by a heavy lift vessel. This method requires hatches to be provided in the tank structure, typically hatches high up in the structure to let air out of the structure and hatches in the lower part of the structure to let water into the internal volume of the tank. Such hatches are only used during installation and retrieval of the tank structure and are operated manually when the tank is in air and by ROV when the tank structure is submerged. Other methods of installation could involve deployment of the tank inshore in sheltered water and penetration of the water surface with the benefit of calm water, for subsequent subsurface tow to the installation site. The latter method requires only small hatches to be provided for controlled deployment.

LIST OF REFERENCE NUMERALS/LETTERS

| | |
|---|---|
| 100, | Subsea storage system |
| 110 | Subsea storage unit |
| 111 | Outer wall |
| 112 | Wall |
| 113 | Inner storage volume |
| 114a | Inner storage volume bottom side |
| 114b | Inner storage volume top side |
| 114c | Inner storage volume vertical side |
| 116 | Inner storage volume lower section |
| 117 | Inner storage volume upper section |
| 118 | Lower section opening |
| 119 | Upper section opening |
| 120a | Fluid conduit |
| 120b | Fluid conduit |
| 120c | Fluid conduit |
| 120d | Fluid conduit |
| 120e | Fluid conduit |
| 121a | Fluid deflector |
| 121b | Fluid distributor |
| 123 | Storage fluid |
| 124 | Anti-stick surface |
| 125a | Maintenance opening |
| 125b | Maintenance opening |
| 126 | Maintenance fluid conduit |
| 127 | Maintenance fluid conduit end |
| 128a | Flow meter |
| 128b | Flow meter |
| 129 | Flow meter transmitter |
| 130 | Barrier fluid |
| 131 | Emulsified barrier fluid |
| 140 | Annulus |
| 142 | Detector for detecting storage fluid |
| 143 | Detector for detecting water |
| 144 | Accumulator |
| 145 | Annulus opening |
| 150 | Monitoring system |
| 151 | Acoustic transciever |
| 152 | Acoustic reflector |
| 153 | Cesium 137 source |
| 154 | Gamma ray receiver |
| 155 | Data processor |

-continued

| | |
|---|---|
| 156 | Inductive sensor |
| 157 | Optical sensor |
| 158 | Data connection |
| 159 | Vertical pipe |
| 160 | Surface installation |
| 161 | Pump |
| 162 | Tank for fresh barrier fluid |
| 163 | Tank for storage fluid |
| 164 | Tank for used barrier fluid |
| 165 | Tank for annulus fluid |
| 166 | Separator bypass conduit |
| 167 | Fluid conduit coupling |
| 168a | Fluid conduit valve |
| 168b | Fluid conduit valve |
| 168c | Fluid conduit valve |
| 168d | Fluid conduit valve |
| 168e | Fluid conduit valve |
| 168f | Fluid conduit valve |
| 168g | Fluid conduit valve |
| 168h | Fluid conduit valve |
| 168i | Fluid conduit valve |
| 168j | Fluid conduit valve |
| 168k | Fluid conduit valve |
| 168l | Fluid conduit valve |
| 169 | Fluid conduit for external connection |
| 170a | Fluid conduit remote controlled valve |
| 170b | Fluid conduit remote controlled valve |
| 170c | Fluid conduit remote controlled valve |
| 170d | Fluid conduit remote controlled valve |
| 171 | Lower section opening sensor. |
| 175 | Capacitive sensor |

The invention claimed is:

1. A subsea storage system comprising a subsea storage unit storing a water miscible storage fluid, wherein the subsea storage unit comprises a wall defining an inner storage volume for storing fluids, wherein the inner storage volume comprises a top side facing the sea surface, a vertical side and a bottom side facing the seafloor, wherein the inner storage volume comprises:

a barrier fluid as a layer between the storage fluid and seawater extending across an entire horizontal cross section of the inner storage volume for separating the storage fluid from the seawater, the barrier fluid being immiscible with both the storage fluid and seawater;

an upper section that extends down from the top side to the barrier fluid within the inner storage volume; and a lower section that extends up from the bottom side to the barrier fluid within the inner storage volume, wherein the upper section comprises at least one upper section opening for fluid connection from the inner storage volume for loading and unloading the subsea storage unit with fluid, wherein the lower section comprises at least one lower section opening configured to provide a fluid connection from the inner storage volume to the ambient sea, wherein the stored storage fluid is positioned above the barrier fluid within the inner storage volume, wherein seawater within the inner storage volume is positioned below the barrier fluid, wherein the inner storage volume is pressure equalized by the fluid connection to the ambient sea, wherein the subsea storage system further comprises a monitoring system configured to monitor at least one fluid layer or fluid interphase within the subsea storage unit, and wherein the monitoring system comprises:
a data processor configured to analyze data;
a plurality of sensors displaced vertically adjacent to a vertical surface of the inner storage volume and configured to detect characteristics of the at least one fluid layer or fluid interphase within the subsea storage unit; and
at least one transmitter configured to transmit data from the plurality of sensors to the data processor.

2. The subsea storage system according to claim 1, wherein the barrier fluid has a thickness of at least 1%, or a thickness between 2-30%, 5-25%, 7-20%, 10-17% or 12-15% of a maximum vertical extent of the inner storage volume.

3. The subsea storage system according to claim 1, wherein the storage fluid is liquid ammonia.

4. The subsea storage system according to claim 3, wherein the plurality of sensors includes a pH-sensor configured to detect the pH of at least one of the fluids within the subsea storage unit.

5. The subsea storage system according to claim 1, wherein the plurality of sensors are configured to detect characteristics of one or more fluid layers or fluid interphases at different vertical levels within the subsea storage unit independently.

6. The subsea storage system according to claim 1, wherein the subsea storage unit comprises:
an outer wall disposed adjacent to the wall so as to provide a two-walled subsea storage unit; and
an annulus between the outer wall and the wall,
wherein the annulus comprises an annulus fluid, and
wherein the plurality of sensors of the monitoring system comprises a detector configured to detect characteristics of the annulus fluid.

7. The subsea storage system according to claim 1, wherein the subsea storage unit comprises one or more fluid deflectors or fluid distributors located in a proximity of the upper section opening or the bottom section opening for preventing disruption of the barrier fluid by flow of liquid to or from the at least one lower section opening or the at least one upper section opening.

8. The subsea storage system according to claim 1, wherein the wall comprises an anti-stick surface facing the inner storage volume, wherein the anti-stick surface has a low wettability for at least one or more of the fluids within the inner storage volume.

9. The subsea storage system according to claim 1, further comprising a fluid conduit fluidly connected to the at least one upper section opening or the at least one lower section opening, wherein the fluid conduit is fluidly connectable to a surface installation for evacuating or adding fluids.

10. A subsea storage system according to claim 9, wherein the fluid conduit comprises:
a flow meter configured to measure and collect data of fluid flowrate;
a transmitter configured to transmit data from the flow meter to the monitoring system; and
a remote controlled valve comprising a receiver connected to the monitoring system, the remote controlled valve being configured to receive a signal from the monitoring system and to adaptively control the flowrate of the storage fluid into the inner storage volume.

11. The subsea storage system according to claim 1, wherein the subsea storage unit comprises at least one maintenance opening for fluid connection from the inner storage volume to an outside of the subsea storage unit,
wherein the at least one maintenance opening is located at a distance that is 10-90% of a vertical extent of the inner storage volume below the top side, and
wherein the at least one maintenance opening is suitable for evacuating or adding fluids.

12. The subsea storage system according to claim 11, wherein the subsea storage unit comprises at least one maintenance fluid conduit configured to provide a fluid connection from the inner storage volume to the outside of the subsea storage unit,
wherein the at least one maintenance fluid conduit extends within the inner storage volume from the inner storage volume top side to a maintenance fluid conduit end distal from the wall, and
wherein the maintenance fluid conduit end of the at least one maintenance fluid conduit respectively comprises the at least one maintenance opening.

13. The subsea storage system according to claim 1, wherein the plurality of sensors includes at least two sensors respectively located adjacent to opposite vertical sides of the inner storage volume, the at least two sensors being configured to detect characteristics of fluid layers or fluid interphases within the inner storage volume.

14. The subsea storage system according to claim 1, wherein the plurality of sensors of the monitoring system comprises:
an acoustic reflector located within the inner storage volume and being configured to reflect an acoustic signal; and
an acoustic transceiver adjacent to a vertical surface of the inner storage volume and being configured to transmit and receive the acoustic signal,
wherein the subsea storage system further comprises at least one transmitter configured to transmit data from the acoustic transceiver to the monitoring system, and to measure time of flight for the acoustic signal through a fluid within the inner storage volume, and
wherein the acoustic signal is reflected from the acoustic reflector for detecting characteristics of the at least one fluid layer or fluid interphase within the subsea storage unit.

15. The subsea storage system according to claim 1, wherein the plurality of sensors of the monitoring system comprises:
a cesium source configured to emit gamma rays horizontally through a layer of fluid within the inner storage volume; and
a gamma ray receiver configured to detect gamma rays located adjacent to the vertical side or within the inner storage volume,
wherein the subsea storage system further comprises a transmitter configured to transmit data from the gamma ray receiver to the monitoring system for detecting characteristics of the at least one fluid layer or fluid interphase within the subsea storage unit.

16. The subsea storage system according to claim 1, wherein the plurality of sensors of the monitoring system comprises an inductive sensor located adjacent to the vertical side or within the inner storage volume, and the subsea storage system further comprises a transmitter configured to transmit data from the inductive sensor to the monitoring system, for detecting characteristics of one or more fluid layers or fluid interphases within the subsea storage unit.

17. The subsea storage system according to claim 1, wherein the plurality of sensors of the monitoring system comprises a capacitive sensor located adjacent to the vertical side, and wherein the subsea storage system further comprises a transmitter configured to transmit data from the capacitive sensor to the monitoring system, for detecting characteristics of one or more fluid layers or fluid interphases within the subsea storage unit.

18. The subsea storage system according to claim 1, further comprising a fluid conduit fluidly connected to at least one maintenance opening, wherein the fluid conduit is fluidly connected to a surface installation, and wherein the fluid conduit comprises:

at least one flow meter configured to measure and collect data of fluid flowrate;

at least one transmitter configured to transmit data from the at least one flow meter to the monitoring system; and a remote controlled valve comprising a receiver connected to the monitoring system, the remote controlled valve being configured to receive a signal from the monitoring system and to adaptively control the flowrate of fluid into or out of the inner storage volume.

19. The subsea storage system according to claim 1, wherein the monitoring system is configured to monitor different fluid layers or different fluid interfaces within the inner storage volume within the subsea storage unit, and wherein the plurality of sensors are configured to detect characteristics of the different fluid layers or different fluid interfaces within the inner storage volume.

20. The subsea storage system according to claim 1, wherein the monitoring system is configured to monitor an emulsified barrier fluid phase within the subsea storage unit, and wherein the plurality of sensors are configured to detect the emulsified barrier fluid phase within the subsea storage unit.

21. The subsea storage system according to claim 1, wherein the monitoring system is configured to monitor differences in a thickness of an emulsified barrier fluid phase within the subsea storage unit, wherein the plurality of sensors displaced vertically adjacent to the vertical surface of the inner storage volume is a first plurality of sensors, wherein the monitoring system further comprises a second plurality of sensors adjacent to a vertical surface on an opposite side of the inner storage volume, the first plurality of sensors and the second plurality of sensors being configured to detect differences in a thickness of a layer of the emulsified barrier fluid on opposite sides within the inner storage volume, and wherein the at least one transmitter is configured to transmit data from the first and second pluralities of sensors to the data processor.

22. The subsea storage system according to claim 1, wherein the monitoring system is configured to monitor differences in a thickness of an emulsified barrier fluid phase within the subsea storage unit, wherein the plurality of sensors displaced vertically adjacent to the vertical surface of the inner storage volume is a first plurality of sensors, wherein the monitoring system further comprises a second plurality of sensors adjacent to a vertical surface on an opposite side of the inner storage volume, the first plurality of sensors and the second plurality of sensors being configured to detect differences in a thickness of a layer of the emulsified barrier fluid on opposite sides within the inner storage volume, wherein the at least one transmitter is configured to transmit data from the first and second pluralities of sensors to the data processor, and wherein the first and second pluralities of sensors are acoustic sensors, inductive sensors, capacitive sensors or nucleonic phase detectors.

23. A method for maintenance of the subsea storage system according to claim 1, the method comprising:

using the monitoring system for collecting data and determining flowrates of a fluid into or out of the inner storage volume, vertical levels of fluid interphases within the inner storage volume, or a fraction of emulsified barrier fluid with seawater relative to total amount of barrier fluid within the inner storage volume.

24. The method according to claim 23, further comprising:

using the monitoring system to identify a barrier fluid or an emulsified barrier fluid in need of maintenance;

evacuating the barrier fluid or emulsified barrier fluid from the inner storage volume via the at least one lower section opening or the at least one upper section opening; and adding fresh barrier fluid to the inner storage volume via the at least one lower section opening or the at least one upper section opening from a surface installation.

25. The method according to claim 23 for maintenance of the subsea storage system, further comprising:

using the monitoring system to identify a barrier fluid or an emulsified barrier fluid in need of maintenance;

adjusting a level of the barrier fluid or emulsified barrier fluid for vertical alignment with at least one maintenance opening by introducing seawater or storage fluid into the inner storage volume;

evacuating a predetermined volume of the barrier fluid or emulsified barrier fluid from the inner storage volume via the at least one maintenance opening to a surface installation; and adding a predetermined volume of fresh barrier fluid via the at least one maintenance opening from the surface installation.

26. The method according to claim 23, further comprising:

analyzing the data collected by the monitoring system by using the data processor for verifying that the barrier fluid layer is extending across the entire cross section of the inner storage volume; and using the monitoring system for transmitting a signal to a fluid conduit valve for automatically adapting flowrates for filling and emptying storage fluid for securing that the barrier fluid layer extends across the entire cross section of the inner storage volume during filling or emptying of storage fluid.

* * * * *